(12) United States Patent
Lassota

(10) Patent No.: US 7,264,186 B2
(45) Date of Patent: *Sep. 4, 2007

(54) FOOD INGREDIENT GRINDER WITH TOOL-LESS REMOVABLE INGREDIENT HOPPER AND METHOD

(75) Inventor: Zbigniew G. Lassota, Long Grove, IL (US)

(73) Assignee: Food Equipment Technologies Company, Inc., Lake Zurich, IL (US)

( * ) Notice: Subject to any disclaimer, the term of this patent is extended or adjusted under 35 U.S.C. 154(b) by 446 days.

This patent is subject to a terminal disclaimer.

(21) Appl. No.: 10/666,575

(22) Filed: Sep. 19, 2003

(65) Prior Publication Data

US 2004/0123747 A1   Jul. 1, 2004

Related U.S. Application Data

(63) Continuation-in-part of application No. 10/030,021, filed as application No. PCT/US00/11379 on Apr. 28, 2000, now Pat. No. 6,626,085.

(60) Provisional application No. 60/132,127, filed on Apr. 30, 1999.

(51) Int. Cl.
*B27K 9/00* (2006.01)
*A47J 31/42* (2006.01)

(52) U.S. Cl. ................. 241/28; 241/100; 241/36; 99/286

(58) Field of Classification Search ............ 241/36, 241/100, 33, 28, 6, 27, 34, 35, 259.1, 261.2, 241/285.2; 99/286, 510, 287, 348
See application file for complete search history.

(56) References Cited

U.S. PATENT DOCUMENTS

| 1,141,898 | A | 6/1915 | Merritt |
| 2,090,634 | A | 8/1937 | Meeker |
| 2,138,204 | A | 11/1938 | Rable |
| 2,229,031 | A | 1/1941 | Anderson et al. |
| 3,744,729 | A | 7/1973 | Ackerman |
| 4,789,106 | A | 12/1988 | Weber |
| 4,947,946 | A | 8/1990 | Konishi et al. |

(Continued)

*Primary Examiner*—Faye Francis
(74) *Attorney, Agent, or Firm*—James W. Potthast; Potthast & Associates

(57) ABSTRACT

A food ingredient grinding assembly (10) with a removable ingredient hopper (32,34) made of translucent material to enable viewing the ingredient within the hopper through a window opening (40,42) and carries a closure assembly (FIGS. 4A and 4B) that automatically closes an outlet opening (112) when the hopper is removed from the housing (12) and when installed is control led by a solenoid (118) that when energized pushes a plate (116) to align an opening (126) in the plate with the outlet opening (112) of the hopper. When the solenoid is not energized or when the hopper is removed, a spring (118) automatically returns the plate to a closed position. Alternatively, the closure plate (116) is pulled by the solenoid (FIGS. 6A, 6B, 7A, 7B, 8A and 8B) through the use of vertically releasable connectors or is pushed or pulled open by an electromagnet (FIGS. 9A, 9B, 10A and 10B). Because the closure assembly (114) is carried by the hopper and the solenoid and electromagnet is not attached to the closure assembly by fixed fasteners the hopper may be removed without the use of any tools simply by lifting it out of the housing and may be installed by simply lowering the hopper into the housing through the housing top.

69 Claims, 11 Drawing Sheets

U.S. PATENT DOCUMENTS

| | | |
|---|---|---|
| 4,967,649 A | 11/1990 | Ephraim et al. |
| 4,971,259 A | 11/1990 | Nidiffer |
| 5,186,399 A | 2/1993 | Knepler et al. |
| 5,241,898 A | 9/1993 | Newnan |
| 5,465,650 A | 11/1995 | Friedrich et al. |
| 5,671,657 A | 9/1997 | Ford et al. |
| 5,718,163 A | 2/1998 | Termini |
| 6,057,514 A | 5/2000 | Maguire |
| 6,298,769 B1 | 10/2001 | Stettes et al. |
| 6,626,085 B1 * | 9/2003 | Lassota ........................ 99/286 |

* cited by examiner

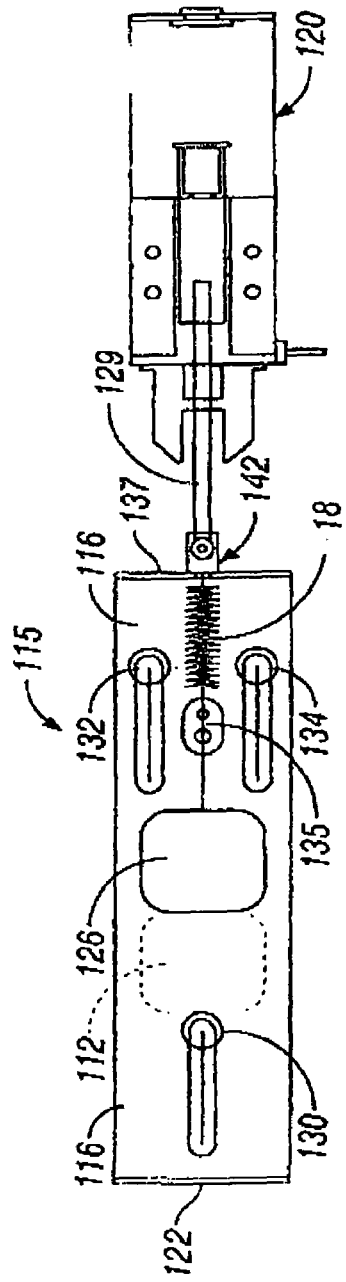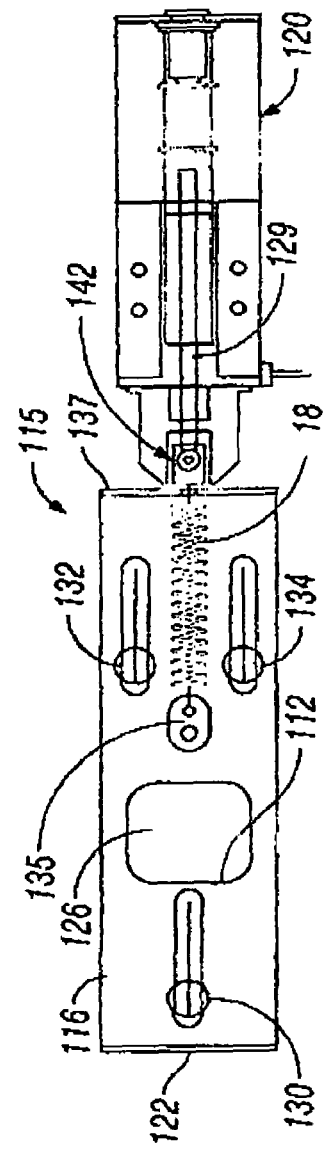
FIG. 6A
FIG. 6B

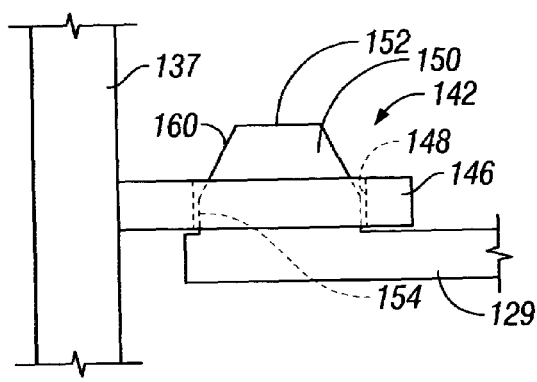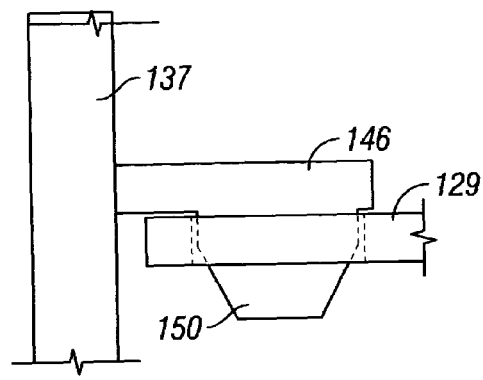
FIG. 7A  FIG. 7B
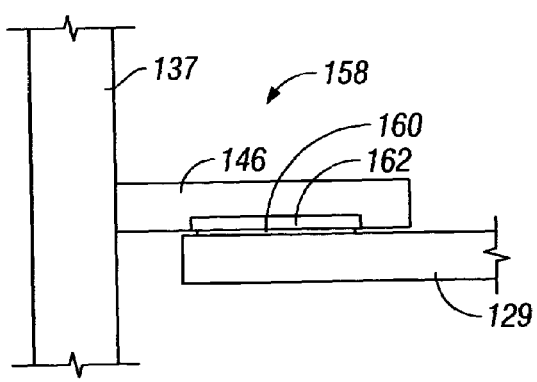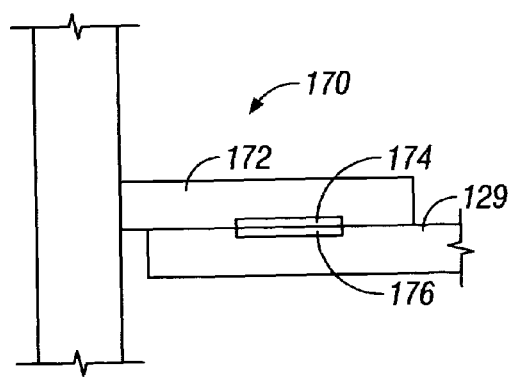
FIG. 8A  FIG. 8B

FOOD INGREDIENT GRINDER WITH TOOL-LESS REMOVABLE INGREDIENT HOPPER AND METHOD

CROSS-REFERENCE TO RELATED APPLICATIONS

This application is a continuation-in-part of and claims under 35USC120 the benefit of U.S. patent application Ser. No. 10/030,021, filed Dec. 26, 2001, now U.S. Pat. No. 6,626,085 issued Sep. 30, 2003, which, in turn, claims under 35USC371 the benefit of PCT application Ser. No. PCT/US00/11379, filed Apr. 28, 2000, which, in turn, claims under 35_USC_119(c) the benefit of U.S. provisional patent application Ser. No. 60/132,127, Apr. 30, 1999.

BACKGROUND OF THE INVENTION

1. Field of the Invention

This invention relates to electrically powered food processing equipment, generally, and, more specifically, to a food ingredient grinder and ingredient hopper and methods of grinding food ingredient, such as coffee beans, and of otherwise maintaining, using and cleaning the food ingredient grinder.

2. Discussion of the Prior Art

Food ingredient grinders of the type designed to grind food ingredient, such as coffee beans, are well known. Modern coffee grinders, such as the FETCO GR Series coffee grinders sold by Food Equipment Technologies Company, Inc., assignee of the present invention, have a support frame to which are mounted at least one ingredient hopper for containing a supply of the ingredient, i.e. whole coffee beans that have not been ground, or are unground. In the case of the FETCO GR-1 and GR-3 coffee grinders, there is only one hopper, respectively, having capacities of six and twenty pounds of coffee beans to be ground in preselected amounts from 1-3 pounds. The beans are dropped out of an outlet at the bottom of the hopper during a preselected time period that an electronically controlled closure of a hopper outlet opening, or hopper outlet, at the bottom of the hopper is opened. The coffee beans fall through the hopper until the approximate amount of preselected quantity of coffee beans has passed through the opening.

In the case of the FETCO GR-2 coffee grinder, there are two separate hoppers that have separately controlled closures and which are capable of mixing the beans of different types of coffee beans in the same grind or to alternatively and selectively grind different types of coffee, such as caffeinated and decaffeinated coffee beans. In such case, the whole coffee beans are passed through a Y-shaped manifold with two inlets, one from each of the two separate hoppers, that passes the mixture through a single manifold outlet opening, or manifold outlet, through a shared, common input to a shared, common grinding chamber. An electronically controlled gating system fixedly mounted within the housing is used to selectively open one or the other of the two hoppers to deposit coffee beans into the grinding chamber. In the case of a single hopper, there is no need for a manifold or a gating system and the coffee beans pass directly into the grinding chamber through a direct, or I-shaped, hopper outlet conduit that is likewise fixedly mounted within the housing.

The coffee beans pass from the I-shaped hopper outlet conduit or pass from the Y-shaped manifold outlet, to the grinding chamber within which are contained intermeshing grinding blades, or grinding wheels, that receive whole coffee beans at the upper inlet to the chamber to be ground. The whole beans are ground by the rotating grinding blades and then are passed through the grinding blades to a grinding chamber outlet, or grinder outlet.

Beneath the grinder outlet is located a brew basket with a conforming filter paper within which is received the freshly ground coffee. The brew basket is removed after the grinding cycle has ended and after all of the preselected coffee is contained within the brew basket. The brew basket is then removed from the grinder and attached to a coffee brewer where hot water is passed through the freshly ground coffee to brew hot coffee. Once one brew basket is removed from the grinder another can take its place and another grinding cycle can commence A portion of the front wall of the housing, which also forms a wall of the hopper, has a plastic, transparent or translucent window. The window enables the operator to view when the hopper is low and needs to be refilled with more beans without having to open the hopper lid and to view inside to do so. The hoppers are permanently mounted within, and integrally formed together, in part, with a housing of the grinder assembly within which all of the elements of the coffee grinder are protectively contained. Accordingly, the hoppers must be filled in place within the housing by opening a lid covering the open top of the hopper, lifting a bag or other container of coffee beans and dumping them into the open top of the hopper.

If it is desired to change the type of coffee contained within a hopper, say from mocha java coffee to Kona coffee, then the hopper must be emptied of the one before the other is introduced, unless it is desired to mix them together. In the case of any one hopper, it is not possible to change the coffee that is introduced into the grinding chamber from that one hopper without first having the one hopper emptied. There is no convenient way of emptying the hopper except by grinding the coffee until all of the beans in the hopper have been ground. Consequently, in the case of a single hopper system, it is also not possible to easily change from one type of coffee to another. In such case, separate grinders are needed for grinding different types of coffees that are required during the same period.

Coffee dust and other coffee constituents from the grinding process and also from the beans themselves stick to the walls of the hopper. Accordingly, even when the beans of one type are removed from the hopper and another type added in its place, there is still some residual coffee of the one type or types previously contained within the hopper that can contaminate the current coffee contained within the hopper. There is no way of conveniently cleaning the hopper. Disadvantageously, while the hopper is being cleaned, the grinding assembly cannot be used. With the hopper in place over the manifold and the grinding chamber, there is no convenient access to these elements for operator cleaning or operator service. The hoppers are in the way and can only be removed with the use of tools needed to disconnect the hopper from the outlet closure gate or disconnecting the linkage with the gate control solenoid that is connected with the outlet closure gate.

SUMMARY OF THE INVENTION

In accordance with the present invention, the disadvantages of known coffee grinder assemblies and hoppers and known grinding methods for food ingredients, such as coffee, are overcome by provision of a gating system and other features that enable the hoppers to be readily removed or replaced for purpose of cleaning and for enabling the changing between different types of ingredient to be ground by tool-less the hoppers that contain the different types of ingredient and by other advantageous features and methods that are described here.

This objective is achieved partly by providing in a grinder assembly for grinding a food ingredient and having a frame, a protective housing mounted to the frame with a top, a grinding chamber containing at least one powered grinding member mounted to the frame within the housing, a removable hopper assembly having a removable ingredient hopper body for holding ingredient to be ground, said ingredient hopper body having an open top for receipt of ingredient to be ground, a bottom with a hopper outlet opening and means for releasably mounting the hopper body within the housing at an operative position in which ingredient may be passed from the hopper body to the grinding chamber; a hopper closure assembly attached to the hopper and including a closure member mounted for movement between and open position and a closed position, and means attached to the hopper body for automatically moving the closure member to the closed position in which the hopper outlet opening is closed by the closure member; and an electromechanical device permanently mounted within the housing for selectively moving the closure member to the open position when the hopper is releasibly mounted at the operative position, engagement of the device with the closure member being non-interfering with manual, tool-less removal of the hopper body by simple manual lifting of the hopper upwardly away from the operative position and out of the top of the housing.

Preferably, the closure member is mounted for laterally sliding movement between the open position and the closed position and the electromechanical device has a pusher member that selectively pushes the closure member laterally to the open position and the pusher member is laterally spaced from and out of engagement when in a closed position, and the electromechanical device is a linear solenoid with a body member and the pusher member is moved away from the solenoid body when the solenoid is energized to engage and push the closure member to the open position and the automatic closure member moving means is a spring carried by the hopper, and the closure member is mounted for laterally sliding movement between the open position and the closed position and the electromechanical device has a puller member that selectively pulls the closure member laterally to the open position.

In another form of the invention, the releasable connector is mounted to the puller member connector and the closure member is permanently connected to another mating connector for mating releasable engagement with the releasable connector. The one of the releasable connector and the other mating connector is a male member and the other of the one connector and the other connector is a mating female member. The female member has an opening that faces in a vertical direction and the male member is received within the opening when the hopper body is lowered through the top into the operative position and is slideably separated from within the opening when the hopper body is lifted vertically out of the housing top and separated from the housing. Preferably, the means for releasable mounting the hopper includes at least one hopper mounting member extending laterally outwardly from at least one of the opposite sides of the hopper, and at least one hopper mounting support member attached to the frame and providing underlying hanging support for the at least one hopper mounting member.

The objective is also obtained in part by providing a food ingredient hopper assembly adapted for use with a food grinder assembly having a protective housing with a manually portable, removable, hopper body for containing a supply of ingredient to be ground by a mating grinding assembly having a housing within which the body is adapted for releasable mounted engagement in an operative location protectively contained within a housing, means carried by the removable hopper body for releasable mounted relationship with the hopper body at an operative location within the housing at which ingredient may be selectively passed to a grinding chamber of the grinder assembly, a hopper outlet opening at the bottom of the hopper, end a hopper outlet closure assembly mounted to the hopper body adjacent to the hopper outlet opening and having a closure member with attached means for engagement by electromechanical means to enable movement of the closure member to an open position by automatic opening apparatus protectively contained within the housing when the hopper body is located in the operative position.

Preferably, the automatic closure means includes at least one of (a) a spring and (b) a permanent magnet. The closure member may be mounted for laterally sliding movement between the open position and the closed position and the electromechanical means may have a puller member that selectively pulls the closure member laterally to the open position. In such case, a releasable connector is mounted to the puller member connector and the closure member is permanently connected to another mating connector for mating releasable engagement with the releasable connector. Preferably, the one of the releasable connector and the other mating connector is a male member and the other of the one connector and the other connector is a mating female member.

The objective of the invention is also obtained in part by providing, for use in an electric food ingredient grinder having a housing within which are located an ingredient hopper body with a hopper outlet opening for passing ingredient to a grinding chamber, a method for tool-less mounting and removal of the ingredient hopper by performing the steps of removably mounting the ingredient hopper within the housing at an operative position in which a closure member carried by the ingredient hopper body is movable to an open position by an electromechanical means contained within the housing, automatically moving the closure member to a closed position by means carried by the ingredient hopper when unopposed by the electromechanical means, selectively energizing the electromechanical means for selectively moving the closure member to the closed position in opposition to the automatically moving means to pass ingredient from the hopper to the grinding chamber, removing the ingredient hopper body from within the housing by simply manually lifting the hopper body upwardly out of the top of the housing.

Preferably, this method includes a step of de-energizing the electromechanical means prior to removing the ingredient hopper body from the within the housing to enable automatic movement of the closure member to the closed position prior to removal, and the step of selectively moving the closure member to the closed position is performed by pushing the closure member to the closed position with a pusher member when the electromechanical means is energized. The pusher member is moved to a lateral position in which the electromechanical means is de-energized that is spaced from a vertical path taken by the hopper body when being installed or removed through the top of the housing to prevent any interference by the pusher member with such installing and removal of the hopper body.

Alternatively, the closure member is moved to the closed position by pulling the closure member through a releasable connection with the electromechanical means to the closed position when the electromechanical means is energized. In one embodiment, the electromechanical means has a connector and the closure member has another connector, and the method includes the steps of mating and separating the one connector with the other connector automatically during vertical installation into the open top of the housing and into the operative position and vertical removal from of the hopper body from the open top of the housing, respectively.

The mating and separating of the connectors may be performed by receiving and separating in a vertical direction, a male connector in a vertical direction and carried by one of the hopper and the electromechanical means within an opening of a mating female connector carried by the other of the hopper body and the electromechanical means automatically during installation and removal, respectively, of the hopper body by lowering and lifting the hopper through the housing top into and out of the operating position.

Alternatively, at least one of the connectors is a permanent magnet and another one of the connectors is either a permanent magnet or a ferromagnetic material, and including the steps of interconnecting the two connectors automatically during installation of the hopper into the operative position to hold by magnetic attractive force against lateral separation during pulling of the closure member to the closed position, and separating the two connectors automatically during removal of the hopper from the operative position by pulling them apart in a vertical direction in opposition to the magnetic attractive force.

In another alternative, at least one of the connectors is an array of resilient hook-like members and the other one of the connectors includes and array of hook-like members and the method includes the steps of interconnecting the two connectors automatically during installation of the hopper into the operative position to hold them against lateral separation during pulling of the closure member to the closed position, and separating the two connectors automatically during removal of the hopper from the operative position by pulling them apart in a vertical direction.

In yet another embodiment, an the electromechanical means is an electromagnet that is spaced from the closure member when closed and the method includes the step of energizing the electromagnet to move the closure member to the open position with electromagnetic force.

The objective of the invention is obtained in part, by providing a grinder assembly for grinding a food ingredient and having a frame, a protective housing mounted to the frame with a top, a grinding chamber containing at least one powered grinding member mounted to the frame within the housing, with a removable hopper assembly having a removable ingredient hopper body for holding ingredient to be ground, said ingredient hopper body having an open top for receipt of ingredient to be ground, a bottom with a hopper outlet opening and means for releasably mounting the hopper body within the housing at an operative position in which ingredient may be passed from the hopper body to the grinding chamber, a hopper closure assembly attached to the hopper and including a closure member mounted for movement between an open position and a closed position, and means attached to the hopper body for automatically moving the closure member to the closed position in which the hopper outlet opening is closed by the closure member, and an electromagnet permanently mounted within the housing for selectively moving the closure member to the open position when the hopper is releasably mounted at the operative position, energizing of the electromagnet creating an electromagnetic force that moves the closure member to the closed position, said electromagnet being spaced from engagement of the device with the closure member being non-interfering with manual, tool-less removal of the hopper body by simple manual lifting of the hopper upwardly away from the operative position and out of the top of the housing.

In one embodiment, a ferromagnetic member is attached to the closure member and attracted by the magnetic force when the electromagnet is energized to move the closure member to the open position and in another embodiment, a permanent magnet is attached to the closure member, and a repulsive electromagnetic force is used to move the closure member to the open force. Preferably, the automatically closure member includes one of (a) a spring, and (b) a permanent magnet.

Also, achievement of the object of the invention is acquired by providing a method for use in an electric food ingredient grinder having a housing within which are located an ingredient hopper body with a hopper outlet opening for passing ingredient to a grinding chamber, for tool-less mounting and removal of the ingredient hopper by performing steps of removably mounting the ingredient hopper within the housing at an operative position in which a closure member carried by the ingredient hopper body is movable to an open position by magnetic force from an electromagnet protectively contained within the housing automatically moving the closure member to a closed position by means carried by the ingredient hopper when unopposed by the electromechanical means, selectively energizing the electromagnet for selectively moving the closure member to the closed position with magnetic force in opposition to the automatically moving means to pass ingredient from the hopper to the grinding chamber, removing the ingredient hopper body from within the housing by simply manually lifting the hopper body upwardly out of the top of the housing. The closure member is moved to the closed position by at least one of (a) pulling magnetic force and (b) a repulsive magnetic force.

The object of the invention is also acquired by providing a grinder assembly for grinding a food ingredient and having a frame, a protective housing mounted to the frame with a top, a grinding chamber containing at least one powered grinding member mounted to the frame within the housing, with a removable hopper assembly having a removable ingredient hopper body for holding ingredient to be ground, said ingredient hopper body having an open top for receipt of ingredient to be ground, a bottom with a hopper outlet opening and means for releasably mounting the hopper body within the housing at an operative position in which ingredient may be passed from the hopper body to the grinding chamber, a hopper closure assembly attached to the hopper and including a closure member mounted for rotary movement between an open position and a closed position, and means attached to the hopper body for automatically rotating the closure member to the closed position in which the hopper outlet opening is closed by the closure member; and an electromechanical device permanently mounted within the housing for selectively rotating the closure member to the open position when the hopper is releasably mounted at the operative position, engagement of the device with the closure member being non-interfering with manual, tool-less removal of the hopper body by simple manual lifting of the hopper upwardly away from the operative position and out of the top of the housing.

Preferably, the electromechanical device is one of (a) a stepper motor, (2) a servo-motor, (3) a DC motor and (4) a rotary solenoid, and the automatically rotating means includes a coil spring having one end attached to the hopper body and another end attached to the closure member. The closure member may include a male connection member that is received within a mating female engagement member associated with the electromechanical device automatically when the hopper is lowered into the operating position. Preferably, the male member is one of (a) pushed to the open position by the female member, and (b) pulled to the open position by the female member.

Part achievement of the invention is also obtained by providing a grinder assembly for grinding a food ingredient and having a frame, a protective housing mounted to the frame with a top, a grinding chamber containing at least one powered grinding member mounted to the frame within the housing, with a removable hopper assembly, having a removable ingredient hopper body for holding ingredient to be ground, said ingredient hopper body having an open top for receipt of ingredient to be ground, a bottom with a hopper outlet opening and means for releasably mounting the hopper body within the housing at an operative position in which ingredient may be passed from the hopper body to the grinding chamber, said releasable mounting means providing a non-blocking support for the hopper body in the operative position of the hopper body from the to enable tool-less removal of the hopper body from the operative position solely by manual separation, a hopper closure assembly attached to the bottom of the hopper body and including a closure member mounted at the bottom for movement between an open position and a closed position, means for automatically moving the closure member to the closed position in which the hopper outlet opening is closed by the closure member when the hopper body is removed from the operative position, and means carried by the closure member for releasable engagement with a mating member within the housing for automatically moving the closure member to the open position when the hopper body is moved to the operative position, and an electromechanically operated gate interposed between the bottom of the hopper body and the grinding chamber and operating independently of the closure member for selectively passing food ingredient from the automatically opened hopper outlet opening to the grinding chamber.

Preferably, the closure member is contained within the body of the hopper and has guide legs extending from the closure member within the body through the outlet opening for guided sliding movement. Engagement of the guide legs by the mating engagement member pushes the guide legs inwardly into the body of the hopper to move the closure member away from the outlet opening to an open position in which ingredient may pass around the closure member to the outlet. The automatically closing means includes the weight of the closure member and the guide legs that causes the closure member to move toward the outlet to the closed position in which the outlet is blocked by the closure member. The movement of the hopper body into and out of the operative position may be either vertical movement through the top or lateral sliding horizontal movement though a side of the housing.

Thus, achievement of the objective is also acquired in part by providing a grinder assembly for grinding a food ingredient and having a frame, a protective housing mounted to the frame with a top and a side, a grinding chamber containing at least one powered grinding member mounted to the frame within the housing with a removable hopper assembly having a removable ingredient hopper body for holding ingredient to be ground, said ingredient hopper body having an open top for receipt of ingredient to be ground, a bottom with a hopper outlet opening and means for releasably mounting the hopper body within the housing at an operative position in which ingredient may be passed from the hopper body to the grinding chamber, said releasable mounting means providing a non-blocking support for the hopper body in the operative position of the hopper body to enable tool-less lateral sliding removal of the hopper body from the operative position solely by lateral sliding movement through the side of the housing, a hopper closure assembly attached to the bottom of the hopper body and including a closure member mounted at the bottom for movement between an open position and a closed position, means for automatically moving the closure member to the closed position in which the hopper outlet opening is closed by the closure member when the hopper body is removed from the operative position, and means carried by the closure member for releasable engagement with a mating member within the housing that automatically engages the closure member as it is slid into the operative position to automatically move the closure member to the open position when the hopper body is moved to the operative position, and an electromechanically operated gate interposed between the bottom of the hopper body and the grinding chamber and operating independently of the closure member for selectively passing food ingredient from the automatically opened hopper outlet opening to the grinding chamber.

Acquisition of the objective is also obtained by provision of a grinder assembly for grinding a food ingredient and having a frame, a protective housing mounted to the frame with a top and a side, a grinding chamber containing at least one powered grinding member mounted to the frame within the housing with a removable hopper assembly having a laterally removable ingredient hopper body for holding ingredient to be ground, said ingredient hopper body having an open top for receipt of ingredient to be ground, a bottom with a hopper outlet opening and means for releasably mounting the hopper body within the housing at an operative position in which ingredient may be passed from the hopper body to the grinding chamber by sliding the hopper into the operative position though the side of the housing, a hopper closure assembly attached to the hopper and including a closure member mounted for movement between and open position and a closed position, and means attached to the hopper body for automatically moving the closure member to the closed position in which the hopper outlet opening is closed by the closure member, and an electromechanical device permanently mounted within the housing for selectively moving the closure member to the open position when the hopper is releasibly mounted at the operative position, engagement of the device with the closure member being non-interfering with manual, tool-less removal of the hopper body by simple manual lateral sliding movement of the hopper away from the operative position and though the side of the housing.

BRIEF DESCRIPTION OF THE DRAWINGS

The forgoing objects and advantageous features of the invention will be explained in greater detail and others will be made apparent from the detailed description of the preferred embodiment of the present invention that is given with reference to the several figures of the drawing, in which:

FIGS. 6A and 6B are plan views of an alternative form of the hopper outlet gate similar to the plan views of FIGS. 4A and 4B, but in which the hopper outlet plate is pulled to the open position shown in FIG. 6B from the closed position shown in FIG. 6A;

FIGS. 7A and 7B are schematic side views of two similar forms of tool-less connections used in association with the alternative embodiment of the hopper outlet gate assembly of FIGS. 6A and 6B;

FIGS. 8A and 8B are schematic side views of two other forms of connection useful with the hopper outlet assembly of FIGS. 6A and 6B;

DETAILED DESCRIPTION

Figure 1:
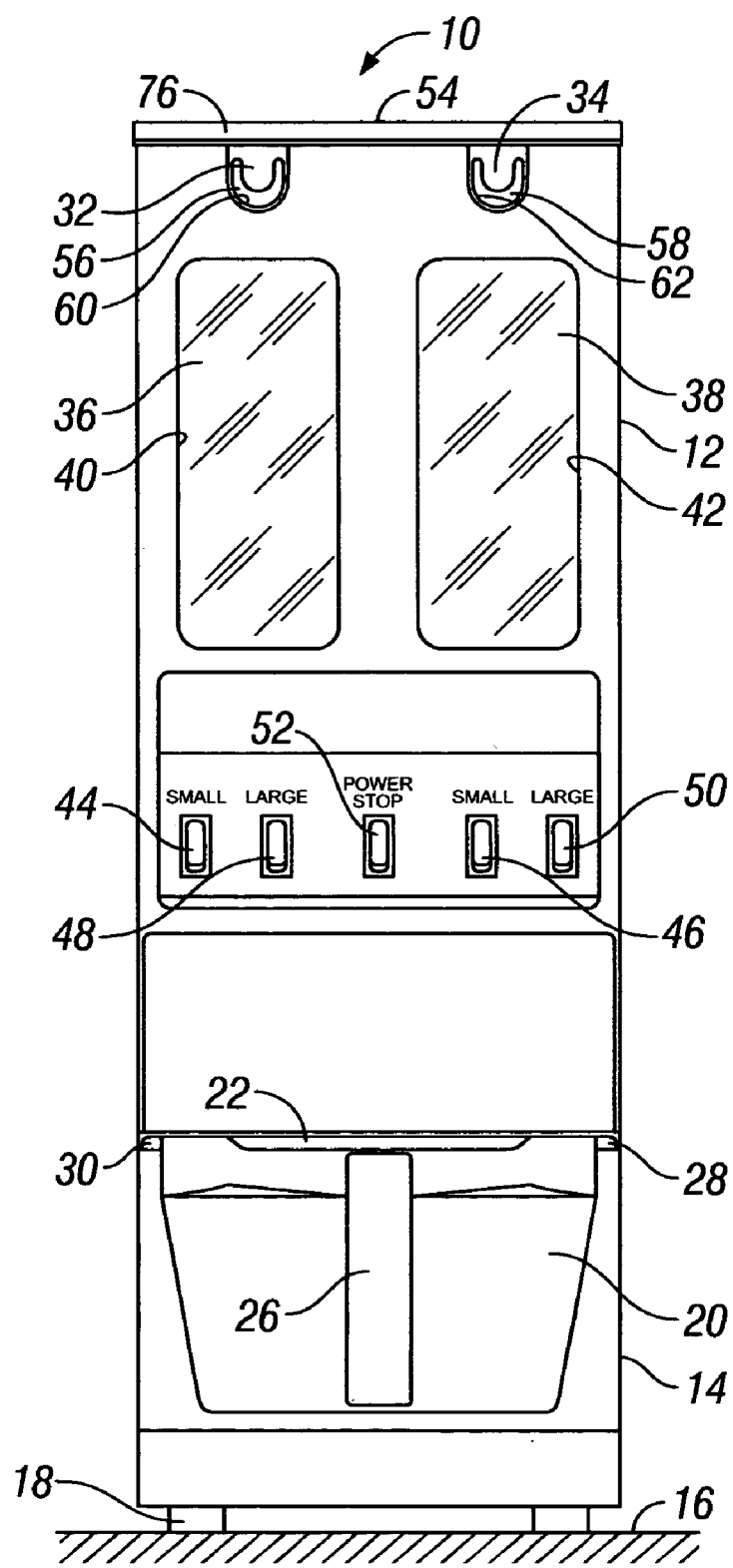
FIG. 1 is a front elevational view of a preferred embodiment of the grinding assembly of the present invention.

Referring first to FIG. 1, the preferred embodiment of the grinder assembly 10 of the present invention is seen to have a stainless steal housing 12 supported on a frame including a base 14 which, in turn, is supported above a counter top 16 by legs 18. A brew basket 20 with an open top 22, a container shaped body and a handle 26 attached to the side of the body 24 is centrally located beneath the housing 12 to receive ground coffee through the open top 22.

The brew basket 20 is releasably mounted to the underside of the housing 12 by means of peripheral flanges 28 that slideably ride on rails 30 mounted beneath the housing 12. Before a grinding cycle, the brew basket with a coffee filter must be first mounted beneath the grinder outlet as shown. After the grinding cycle, the brew basket 20 is removed with the ground coffee and installed in a brewer (not shown) where hot water is passed through the ground coffee to prepared freshly brewed coffee.

The grinding assembly 10 preferably includes a pair of substantially identical hoppers, a left hopper 32 and a right hopper 34. Both hoppers have translucent portions 36 and 38 that are aligned with window openings 40 and 42 in the front of the housing 12. The controller for the grinder assembly, which forms no part of the present invention, has two pairs of grind start switches 44 and 46 for control of grinding of coffee from the left hopper 32 and the right hopper 34, respectively. Actuation of start switches 44 and 46 causes the grinder to grind preselected, relatively small amounts of coffee from the left and the right hoppers, respectively, while actuation of switches 48 and 50 results in the grinder assembly 10 grinding relatively large preselected amounts of coffee. Actuation of a power stop switch 52 terminates all grinding from either hopper. For further information concerning the controller, reference should be made to my copending application Ser. No. 09/397,834, filed Sep. 17, 1999 and entitled "Food Ingredient Grinder Assembly and Method", now U.S. Pat. No. 6,783,089, which as hereby incorporated by reference.

The grinder assembly 10 also has a hinged top lid 54 that overlies the open tops of the hoppers 32 and 34. The lid is normally kept closed during operation but is opened to install the hoppers themselves, or coffee beans into the hoppers 32 and 34, into the housing 12. Pairs of arcuate hopper handles 56 and 58 (only one shown of each pair) extend outwardly from the fronts and backs of hoppers 32 and 34, respectively. The handles are located adjacent the tops of hoppers 32 and 34, and due to their arcuately shaped lower surfaces, are readily guided into their associated mounting slots 60 and 62. The arcuately shaped bottom surfaces of the handles are supported within the slots by correspondingly shaped, arcuately shaped bottom surfaces of the mounting slots in the front of the housing 12. These handles, in addition to facilitating manual mounting and removal of the hoppers from the housing, assist in the releasable mounting and support of the hoppers 32 and 34 in proper alignment within the housing 12 for proper interaction with the other elements of the hopper assembly.

Figure 2:
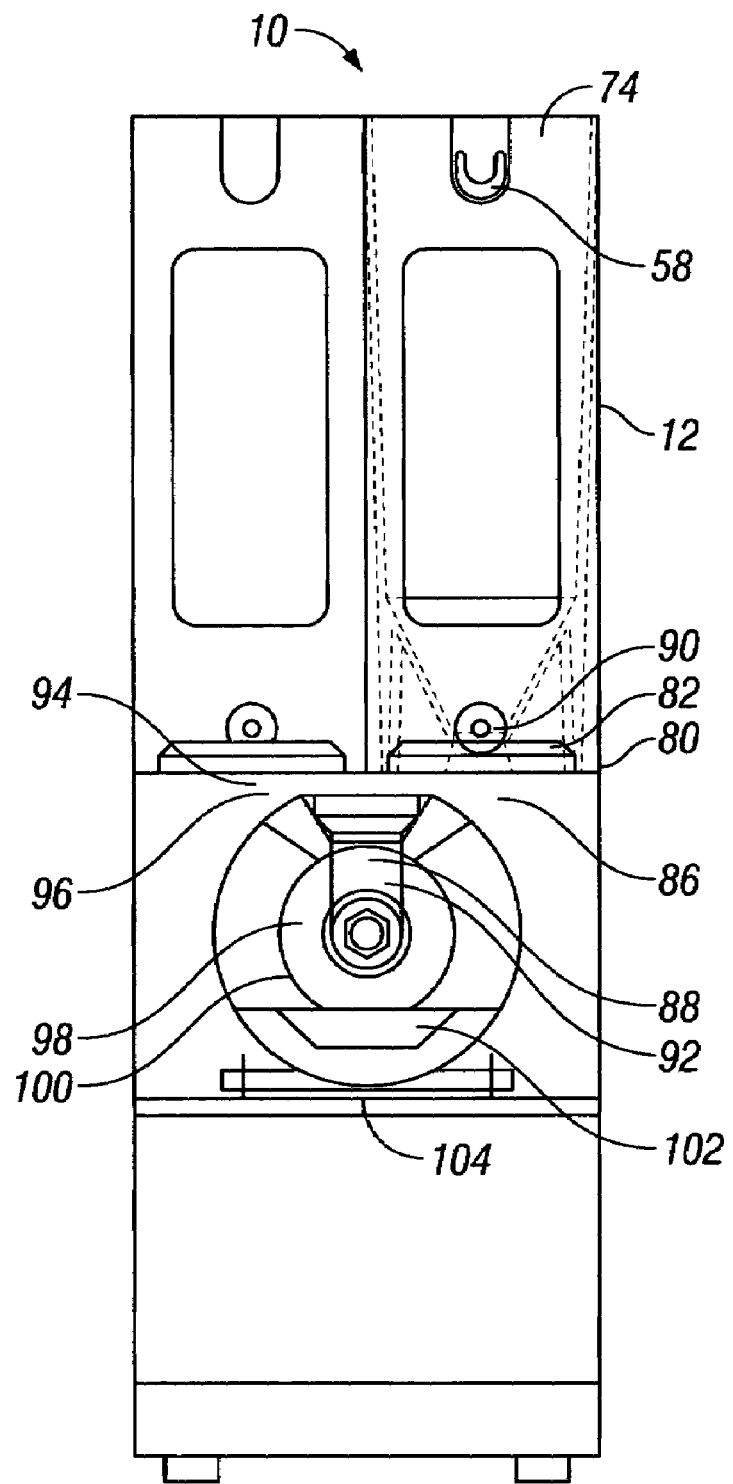
FIG. 2 is sectional, partially schematic, front elevational view of the grinder assembly of FIG. 1 but with the left hopper removed and showing the details of the releasable and removable mounting of the right hopper within the housing supported by the upper edges of the housing side walls of the grinder assembly and also showing the manifold, the grinding chamber, the grinding wheel and the grinding chamber outlet.

Referring now to FIG. 2, the grinder assembly 10 is seen with the left hopper 32 removed from within the housing. Preferably, the hoppers 32 and 34 are both made of translucent, impact resistant plastic that is integrally molded together with the pairs of handles 56 and 58. Accordingly, there is no need for there to be any other translucent window material permanently mounted to the housing and filling the window openings 40 and 42. The window openings are preferably free of any material, in order to facilitate access to the interior of the housing 12 for cleaning, maintenance or repair and to eliminate the cost of such additional translucent material.

Figure 5A:
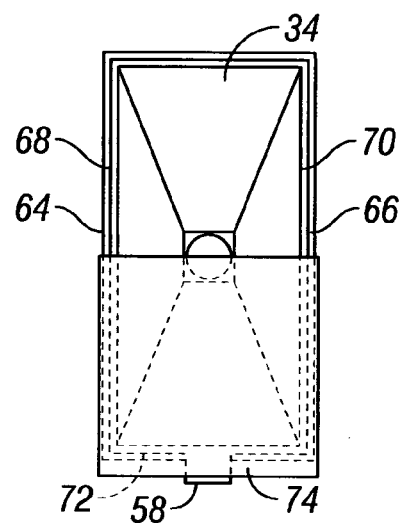
FIGS. 5A, 5B and 5C are respectively plan, front elevation and side elevation views of the hopper removed from the grinder assembly and being supported on a counter top.
Figure 5B:
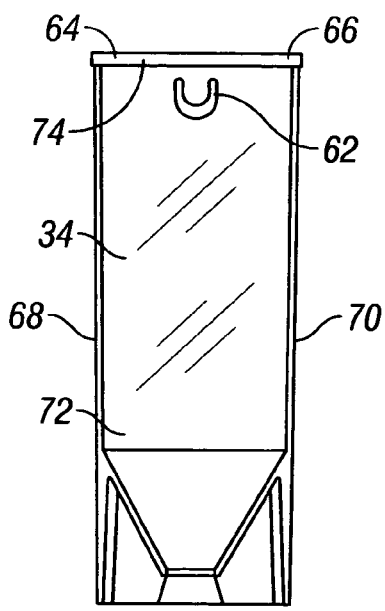
Figure 5C:
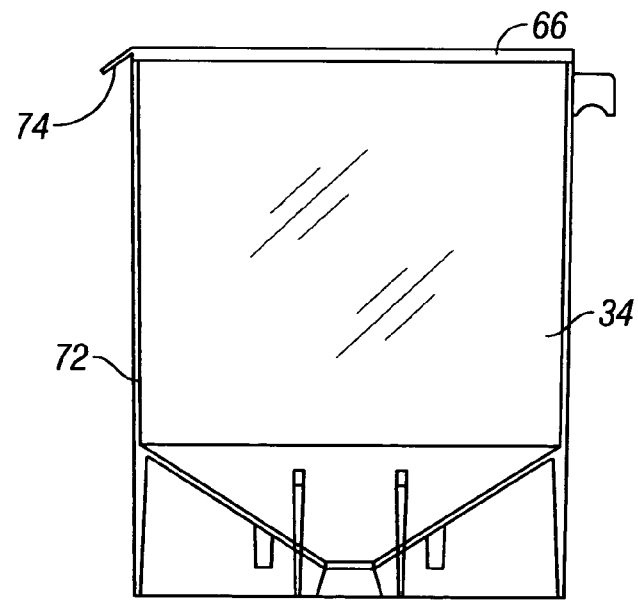

As best seen in FIGS. 5A-5C, the hoppers have laterally extending, side mounting members 64 and 66 that extend laterally Atom the opposite, relatively long, side walls 68 and 70 of hopper and another laterally extending forward mounting member 74 extending laterally outwardly from the front wall 72. The laterally extending mounting members are supported by the top edges of the housing side and front walls, and, in the case of the of a double hopper grinding system such us shown here, the interior side 0f the hopper is supported by the edge of a support bar 80, FIGS. 1 and 2. The support bar 80 is located at the same level as that of the top edges of the side and front walls of the housing, extends from the front to the back of the housing, and functions as an underlying support member. In the case of a single hopper system in which only one hopper is provided, there is no need for the support bar 80, for the hopper extends across the entire housing, and the side wall support members of the hopper are both supported by the upper edges of the opposite side walls of the housing.

In the ease of the forward support member 74, in addition to extending laterally outwardly from the front wall, it has a canted portion that extends at an acute angle downwardly along the front wall 72. This downwardly canted portion restrains the top of the hopper 32 against relative lateral movement while also guiding the hopper into correct alignment with the front wall top edge. Once in place, the forward support member 74 also restrains the hopper against rearward movement. The downwardly extending portions of the support members also facilitates their use in accordance with the invention as handles for manually installing, removing and otherwise handling the hopper.

As seen in FIG. 1, the top lid 54 also has a forward extending portion 76 that overhangs the forward mounting member 74 to facilitate use of the forward extending portion 76 as a handle for lifting and lowering the front part of the hinged body of the lid 54. The forward extending portion 76 extends beyond and overlies the entirety of the mounting member to enable the underside surface to be manually engaged without being blocked by the mounting member 74. After the lid is pivoted up and out of the way to an open position, then the mounting member 74 is accessible for lifting the hopper out of the housing 12.

Referring again to FIGS. 2 and 3, the housing has a shelf 80 upon which is supported a hopper support outlet pad 82 with a pair of cylindrical support elements 84 mounted fore and aft to the frame of the grinding assembly 10. The hopper support outlet pad 82 has a canted passageway 86 through which extends an intake pipe of a Y-shaped manifold 88 that passes coffee beans received at its inlet 90 to a common outlet 92 that is shared with another canted outlet passageway 94 that extends into the other intake pipe 96 of the Y-shaped intake manifold 88.

The coffee beans fall from the common outlet 92 into a grinding chamber 98 with powered, intermeshing grinding discs that are driven by an electrical motor 100. The ground coffee then falls trough an outlet chute 102. The outlet chute 102 has a flared outlet opening 104 that faces the open top of the brew basket 20A and the ground coffee fall into the filter paper within the brew basket. The brew basket 20 is then removed an mounted to a brewer for the brewing of coffee and a new, empty brew basket is substituted in its place to receive the next batch of freshly ground coffee. The removable unground ingredient hoppers 34 and 35 when mounted inside the housing 12 enable viewing inside through the window openings 40 and 42 front outside of the housing when the hoppers are mounted inside the housing. The window openings 40 and 42 arc generally unblocked and generally open when the ingredient hoppers are not mounted within the housing 12.

Preferably, the entire bodies of the removable hoppers are made of translucent or transparent plastic such that the window 36. When the entire ingredient hopper is made of translucent material the portion of the side of the hopper that aligns with the window opening is the window. Alternatively, the windows are only provided at the locations of the window openings.

Figure 3:
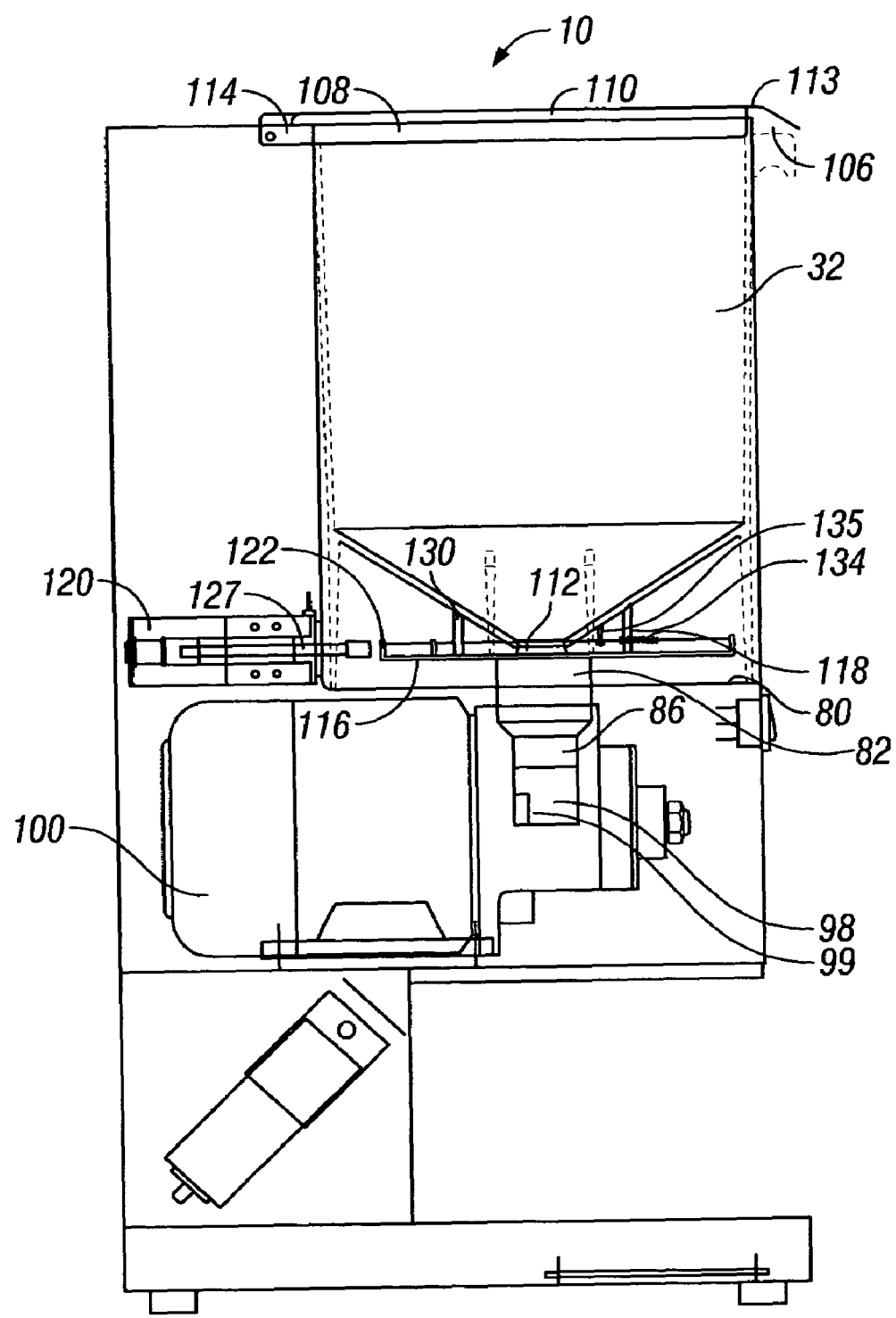
FIG. 3 is a sectional side view of the grinder assembly of FIG. 2.

As best seen in FIG. 3, the ingredient hoppers 32 and 34 each have a mounting member or flange 106 integrally formed together with the hopper body and the window, that is located adjacent the open top 108 cube ingredient hopper. The flange 106 extends laterally outwardly from the sides and around the perimeter of the open top 108 for hanging the hopper from a mating underlying support member 110 located adjacent the top of the housing 12. The flange 108 is downwardly turned and extends downwardly along the perimeter of the open top alongside the side of the housing to restrain the hopper against lateral movement relative to the housing 12. A housing cover 112, is hingedly mounted by pivot pins connected to the hopper assembly housing, and is used to close the open top of the housing.

In keeping with an important aspect of the invention, the mounting of the hoppers 32 and 34 within the housing 12 and removal from the housing is accomplished manually without the need for any tools.

Figure 4A:
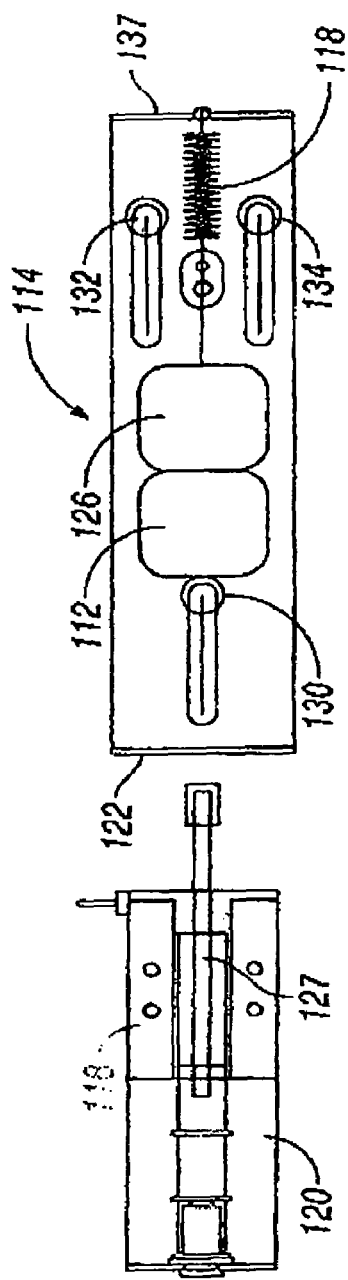
FIGS. 4A and 4B are sectional plan views of the hopper outlet gate assembly of FIG. 3 with the gate in the closed position, as shown in FIG. 3, and in the open position, respectively.
Figure 4B:
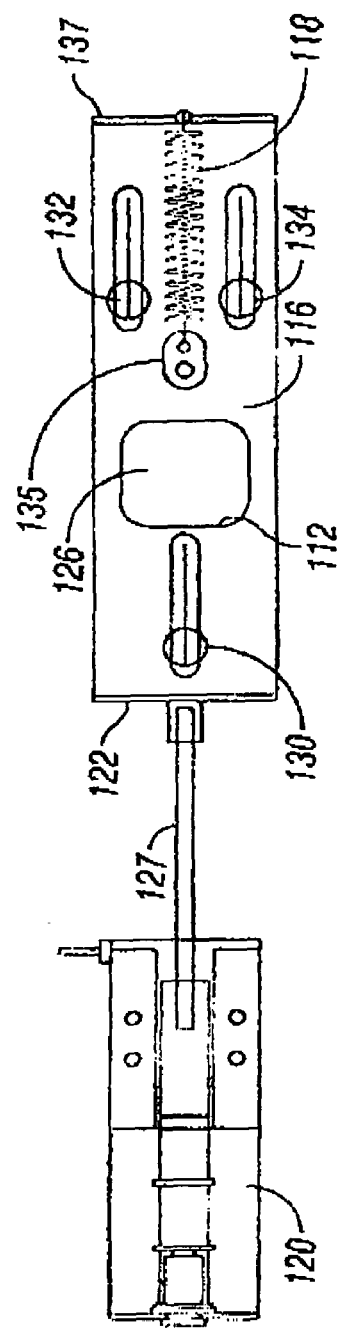

Referring now to FIGS. 3, 4A and 4B, the ingredient hoppers each have an outlet opening 112 for passage of the ingredient from the hopper into the grinding chamber. The outlet opening 112 has an outlet closure assembly 115 that automatically closes the outlet opening 112 when the hopper is removed from the frame 20 that prevents spillage of the ingredient. When the hopper is removed for cleaning, loading or replacement with another hopper containing a different ingredient, from the frame 12, the closure assembly 114 automatically closes the hopper outlet opening 112 in response to removal from the housing, or whenever the closure assembly is not being forced to an open position. This prevents spillage of any unground ingredient into the housing or elsewhere and enables removal by the users as needed, without the need for any tools or the need for any actions needed to disconnect the hopper from the housing except the mere lifting of the hopper out of the top of the housing.

The outlet closure assembly 115 includes a closure member, or cover plate, 116 that is mounted to the hopper for sliding movement between a closed position, as shown in FIG. 4A, in which the hopper outlet opening 112 is covered by a portion of the cover plate 116, and an open position, as shown in FIG. 4B, in which the hopper outlet opening 112 is aligned with an opening 126 in the cover plate and uncovered, or open. The cover plate 116 is biased for movement from the closed position, as seen in FIG. 4A, and the open position, as seen in FIG. 4B with a spring 118.

Within the hopper assembly housing is a solenoid 120. When the hopper 32 or 34 is located in its operative position, as shown in FIG. 3, the closure member is aligned for selectively resisting the spring 118 to move the cover plate 116 from the closed position to the open position. As seen in FIG. 3, when the solenoid 120 is energized, a solenoid plunger, pusher member, or pin, 127 is extended from the solenoid 120 and pushes on an upturned, generally vertical, side wall 122 of the cover plate 116 to move the cover plate to the open position, as shown in FIG. 4B. The spring 118 is stretched and resiliently resists this movement, and the cover plate remains in the open position only so long as the solenoid remains energized. In the open position, the ingredient passes from the hopper 32 or 34 and though the hopper outlet 112 and the cover plate opening 126 and into the grinding chamber. When the solenoid 48 is de-energized, the pusher member 127 retracts, as shown in FIG. 4A, and the spring 118 contracts and automatically resiliently pulls on the cover plate to return the cover plate 116 to the closed position. In the closed position, the outlet opening 112 is not aligned with the opening 126, and passage of ingredient is blocked by the cover plate 116.

In keeping with an important aspect of the invention, as seen in FIG. 3, when the solenoid 120 is de-energized and the pusher member 127 is in its retracted position, the pusher member 127 is disengaged from and substantially spaced from the cover plate 116 so as not to block either the installation or the removal of the hopper into and out of the hopper position by simple, tool-less, manual lowering and lifting of the hopper relative to the housing, as may be desired. Preferably, the hopper is only removed when the solenoid is de-energized and installed when the solenoid is not energized. An interlock switch is preferably provided to prevent energizing of the solenoid when the hopper is not in the operative position. Advantageously, should the hopper inadvertently be removed while the solenoid is still energized, as soon as the cover plate is lifted out of alignment with the pusher member 127, the spring 118 will automatically snap shut the hopper outlet opening 112 to reduce or prevent spillage of ingredient from the bottom of the hopper.

The cover plate 116 is guided in its sliding movement by fixed mounting posts 130, 132 and 134 fixedly attached to the body of the hopper extending generally vertically downwardly and received through three elongate, parallel mating guide slots in the plate 116. The posts 130, 132 and 134 have underlying shoulders with upward facing shoulders upon which the underside of the cover plate 116 rides during sliding movement. These underlying support shoulders may be at the ends of threaded members that are screwed into threaded bores within the posts 130, 132 and 134. The fixed end of the spring 118 is attached to a spring post 135 attached to the underside of the hopper body while the movable end is attached to a spring mounting hole in an upstanding end wall 137 located at the end of the wall 22 being pushed by the pusher member 127.

Referring now to FIGS. 2 and 3, in accordance with the method of the invention for grinding a food ingredient, such as coffee beans, in a grinder assembly 10 having a frame 12 and a grinding chamber 98 with powered grinding blades mounted within a generally closed opaque housing and having a window opening for viewing into the hoppers, includes the step of placing a load of unground ingredient into an ingredient hopper 32 or 34 with a translucent window 36 or 38, respectively, and releasably mounting the ingredient hopper containing the unground ingredient inside the housing with the translucent window aligned with the window opening in the housing 12. This enables viewing into the ingredient hopper through the window opening from outside of the housing when the ingredient hopper is mounted inside the housing 12. The method includes the step of selectively opening an outlet opening of the ingredient hopper to drop unground ingredient from the ingredient hopper to the grinding chamber 98 containing powered grinding blades 99 to grind the ingredient.

Upon completion of grinding the ingredient the method includes the step of removing the ingredient hopper from within the housing after depletion of the unground ingredient and cleaning the ingredient hopper of any residual material. The ingredient hopper is then refilled with another load of unground ingredient of a different type, such as decaffeinated coffee versus non-decaffienated coffee, and remounted inside the housing with the translucent 26 window aligned with the window opening to grind the other load. Alternatively, instead of cleaning, the hopper is not cleaned but is refilled with the same type of ingredient. Alternatively, a partially filled hopper is removed before it is empty and replaced with another hopper containing a different type of ingredient.

Upon removal of the ingredient hopper the window opening the window are unblocked and open. The remounting of the ingredient hopper is performed by hanging the ingredient hopper with a mounting member, or flange 106, which laterally extends outwardly from the top of the ingredient hopper along the perimeter of the open top. The flange has a downwardly turned portion that extends downwardly alongside a portion of the side of the housing to restrain the ingredient hopper against lateral movement relative to the housing.

As explained above, the hopper has an open top for receipt of ingredient to be ground and a bottom with an outlet opening for passage of the ingredient into the grinding chamber. In accordance with the method of the invention, the outlet opening is automatically closed by a closure member, or cover plate, of a closure assembly 42 mounted to and carried by the ingredient hopper when removed. The closure member automatically closes the outlet opening when the ingredient hopper is removed from the frame. The hopper is not blocked from removal by any fasteners of any kind and may be removed without tools by simply lifting the hopper out of the housing. In accordance with the method, the closure assembly selectively moves the cover plate between a closed position, as seen in FIG. 2B, in which the hopper outlet opening is covered by the cover plate and an open position in which the unground ingredient is allowed to pass through the hopper outlet opening when the ingredient hopper is mounted within the housing.

Upon completion of the grinding of the ingredient, the closure assembly automatically moves the cover plate to a closed position, as seen in FIG. 2C in which the unground ingredient is prevented from passing through the hopper outlet. The opening and closing of the cover plate of the closure assembly includes the steps of spring biasing the closure member for movement to the closed position, and selectively overcoming the biasing force of the spring to move the cover plate to the open position. The step of selectively overcoming the biasing force includes the step of selectively energizing a solenoid to move the cover plate to the open position as seen in FIG. 2C.

Significantly, the solenoid plunger is not connected to the plate but merely pushes the cover plate to resist the spring biasing means and push the cover plate to the open position whenever the solenoid is energized.

Another aspect of the invention is achieved by providing the step of automatically closing the outlet opening when the ingredient hopper is removed from the frame by biasing the spring to automatically move the cover plate into the closed position when the ingredient hopper is removed from the hopper assembly.

Referring to FIGS. 6A and 6B, another form of the invention is shown in which instead of pushing the cover plate 116 to the open position, the solenoid has been moved from the side of the cover plate 116 adjacent the end wall 122 to the side adjacent end wall 137 and pulls the cover plate from the closed position shown in FIG. 6A to the open position shown in FIG. 6B. A puller member 129 selectively pulls the closure member 116 to the open position when energized. A releasable connector assembly 142 releasably connects the puller member 129 with the wall 137 of the closure plate 116. The releasable connector assembly 142 includes a releasable connector fixedly mounted to the puller member connector and another mating connector for mating releasable engagement with the releasable connector that do not interfere with the removal and installation of the hopper.

Referring to FIG. 7A, one form of the releasable connector assembly 142 includes a plate like female connector 146 fixedly attached or formed integrally with the end wall 137 of the cover plate 116 and extending laterally outwardly from the wall 137 and toward the solenoid 120. The female connector 146 has a round connection opening 148 that faces downwardly within which is received a upwardly projecting, mating male connector member 150. Preferably, the male connector member 150 has an upper section with a truncated, conical top with a circular upper, leading edge surface 152 and a guiding conical surface 160 that extends from the top surface 152 to the top of an upstanding cylindrical section 154 that is attached to the end of the pusher member 129. This inwardly tapered distal end of the male connector member 150 helps guide and facilitate insertion of the male member 150 into the mating female opening 148.

Because the female member 146 has an opening 148 that faces in a vertical direction and the male member 150 extends in a vertical direction, the mating connector is automatically received within the opening 148 when the hopper body 32 is lowered through the top of the grinder housing into the operative position. Likewise, the male connector is automatically, slideably separated from within the opening when the hopper body is lifted vertically out of the housing top and separated from the housing.

As shown in FIG. 7A, the male member 150 is mounted to the distal end of the puller member 129 and extends upwardly and the female member is attached to the end wall 137 of the closure member 116 with the opening of the female member facing downwardly. Alternatively, as shown in FIG. 7B, the male connector member 150 is mounted to the upstanding wall 137 and extends downwardly, and the female connector member 146 attached to the distal cod of the pusher member 129 with an opening facing upwardly.

Referring to FIG. 8A, in another embodiment of a toolless connector assembly 158, the releasable connectors are formed of a permanent magnet 160 carried by one of the connector 146 and the distal end of the puller member 129 that attaches through magnetic force to the other of the connector 146 and the puller member 129 that may be formed of ferromagnetic material that is attracted to the permanent magnet 160 or which carries a ferromagnetic member 162 or another permanent magnet with an opposite magnetic pole that is carried by the other member. The permanent magnet 160 and the one of the other permanent magnet and the ferromagnetic member 162 automatically magnetically adhere to each other when the hopper body is lowered to the operative position. The ferromagnetic and magnetic materials are selected to insure that the attractive force is sufficient to enable the puller member to pull the closure member 116 to the closed position in opposition to the force of spring force 118. If a permanent magnet and opposed permanent magnet or a ferromagnetic material are used to produce a magnetic closure force in lieu of the spring 116 to bias the closure member 115 to return to the closed position when not opposed, then the materials are selected to insure that this magnetic closure force is overcome.

Referring to FIG. 8B, another releasable connector assembly 170 is shown in which one of the connectors 146 attached to the hopper body includes a fastener hook array member 174 and the other releasable connector carried by the puller member 129 includes a fastener loop array member 176 for mating releasable connection with the fastener hook array member 174. Such hook and loop array members may be like Velcro™ fasteners or the mechanical equivalent. Alternatively, one array is made of horizontal members and the other array is made of vertical members that intermesh with the horizontal members when the two arrays are brought together to enable the members of one array to pull against the members of the other array in a horizontal direction.

Figure 9A:
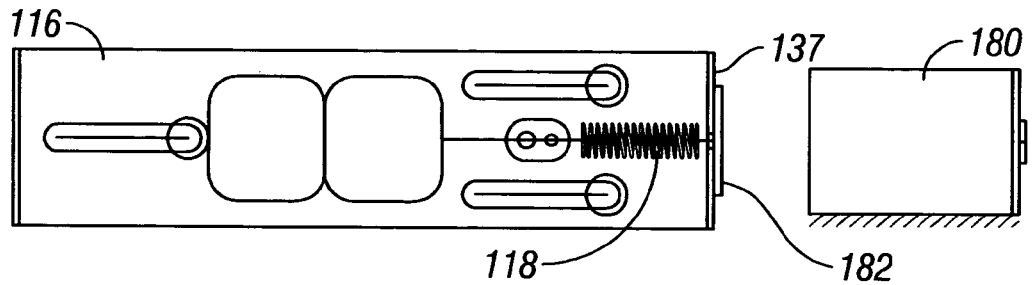
FIGS. 9A and 9B are plan views of another alternative form of the hopper outlet gate similar to the plan view of FIGS. 6A and 6B, but in which the pulling or pushing of the closure member to the closure plate or member in the closed and open positions, respectfully, is achieved with an electromagnet that pulls the closure member to the open position.
Figure 9B:
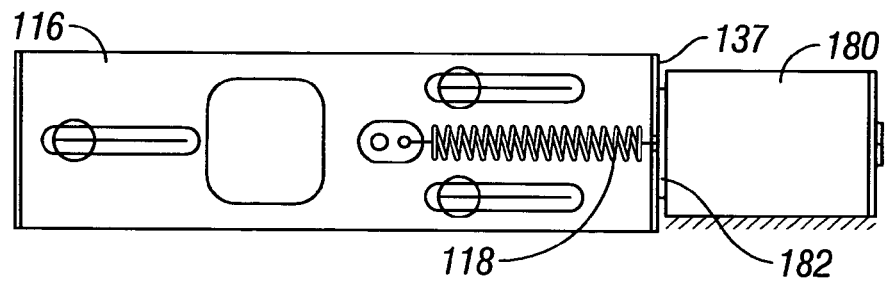

All the connectors have sufficient holding strength when lateral force is applied to enable the puller member 29 to pull the closure member 116 to the open position in opposition to bias spring 118 while allowing separation in the vertical direction 23 without out the need or use of any tools or other manipulation other than simply moving the connectors apart in a vertical direction. It is contemplated that the spring 118 may be replaced with a permanent magnet interacting with a ferromagnetic member carried by the hopper. In such, case the connectors must have sufficient holding strength to overcome the force of the permanent magnet used to bias the closure member to the closed position. In any event, the connectors enable the automatic mating and separating of the connectors by lowering and lifting the hopper through the housing top into and out of the operating position. Referring to FIGS. 9B and 9B, instead of connectors used to enable pulling of the closure member, as shown in FIGS. 6A-8B, or a reciprocally moving pusher member associated with a solenoid, as shown in FIGS. 4A and 4B, an electromagnet 180 mounted within the housing in a fixed position is used to attract or repel with electromagnetic force the closure member 116. In FIG. 9A, the wall 137 carries a ferromagnetic member 182 that is attracted to the electromagnet 180 when the electromagnet is energized when the hopper is releasably mounted at the operative position. As seen in FIG. 9A, when the electromagnet 180 is not energized, the spring 118 keeps the closure member 116 in the closed position. Advantageously, the electromagnet 180 is spaced from the ferromagnetic member 182 and closure member 116 and does not interfere with the installation and removal of the hopper body. When the electromagnet is energized, an attractive electromagnetic force is created that pulls the closure member to the closed position, as shown in FIG. 9B. The closure member remains in the closed position as long as the electromagnet remains energized.

Figure 10A:
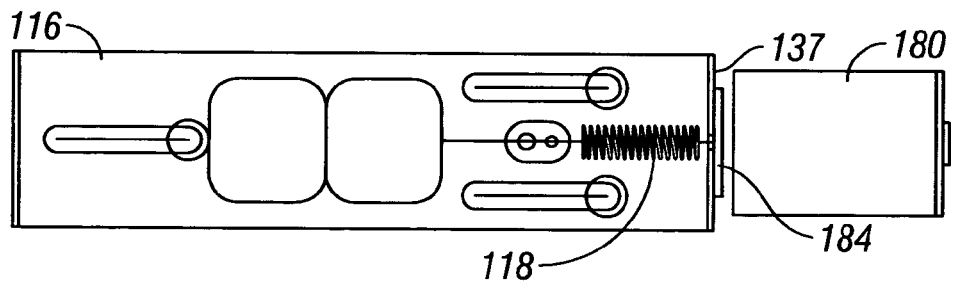
FIGS. 10A and 10B are plan views of yet another alternative form of the hopper outlet gate assembly similar to the plan view of FIGS. 9A and 9B, but in which the electromagnet pushes the closure member to the open position.
Figure 10B:
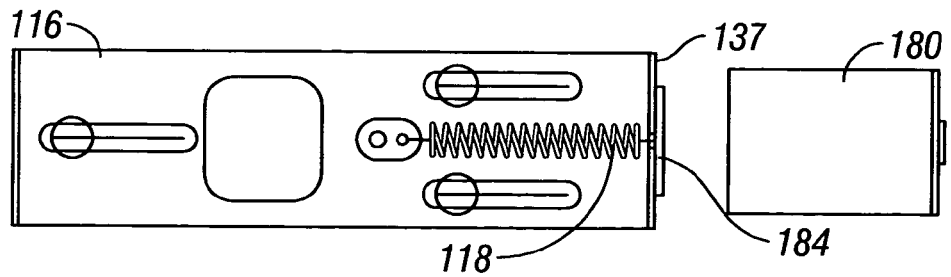

Referring to FIGS. 10A and 110B, another embodiment of the hopper opening mechanism similar to that of FIGS. 10A and 10B is shown in which the ferromagnetic member 182 is replaced with a permanent magnet 184. When the electromagnet 180 is not energized, as shown in FIG. 10A, then the closure member is located adjacent one pole of the electromagnet 180 and the closure member is in a closed position. The adjacent pole of the electromagnet and the closest pole of the permanent magnet are of the same polarity, and when the electromagnet 180 is energized, a repulsive magnetic force is created that pushes the permanent magnet 184 and the closure member away from the electromagnet 180 to the open position.

Thus, it is seen that the present invention enables a method for tool-less mounting and removal of the ingredient hopper in an electric food ingredient grinder having housing within which are located in the ingredient hopper body with a hopper outlet opening for passing ingredient to a grinding chamber, by performance of the steps of: (1) removably mounting the ingredient hopper within the housing at an operative position in which a closure member carried by the ingredient hopper body is movable to an open position by magnetic force from an electromagnet protectively contained within the housing, (2) automatically moving the closure member to a closed position by means carried by the ingredient hopper when unopposed by the electromechanical means, (3) selectively energizing the electromagnet for selectively moving the closure member to the closed position with magnetic force in opposition to the automatically moving means to pass ingredient from the hopper to the grinding chamber, and (4) removing the ingredient hopper body from within the housing by simply manually lifting the hopper body upwardly out of the top of the housing. The step of selectively moving the closure member to the closed position may be performed by an electromagnetic pulling force or a pushing force to overcome an automatic closure spring or closure permanent magnet. When a pulling force is used, this is accomplished though the use of releasable connectors that do not interfere with installation or removal or by an electromagnet that is disengaged and spaced from the closure member when in the closed position. When a pushing force is used, a solenoid is used to push the closure member to the open position with a pusher member, and the pusher member is disengaged and spaced from the closure member when the in the closed position, or an electromagnet generates an electromagnetic repulsive force that pushes the closure member to the open position.

Figure 11:
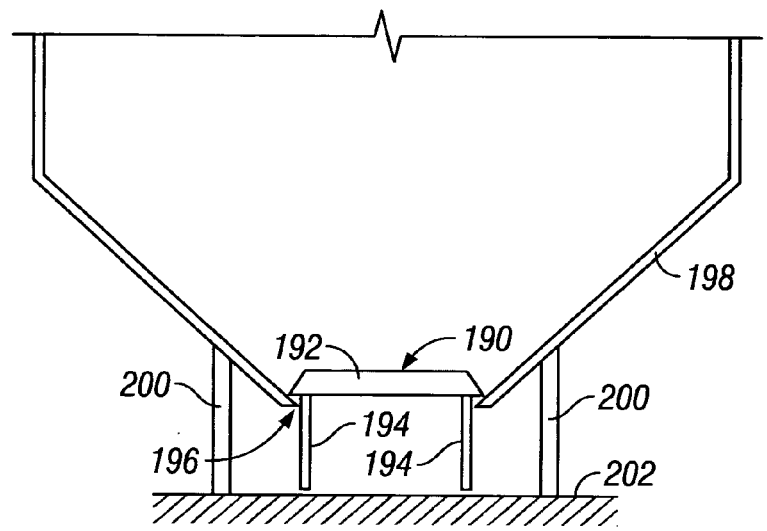
FIG. 11 is a schematic side view illustration of another embodiment of the removable hopper of the present invention in which automatic closure of the outlet opening of the hopper body is achieved through positioning of the closure member within the hopper body to enable automatic closure by means of the force of gravity pushing down on the closure member to move it to the closed position when unopposed and that is used with a separate gate entirely contained within the housing.
Figure 12:
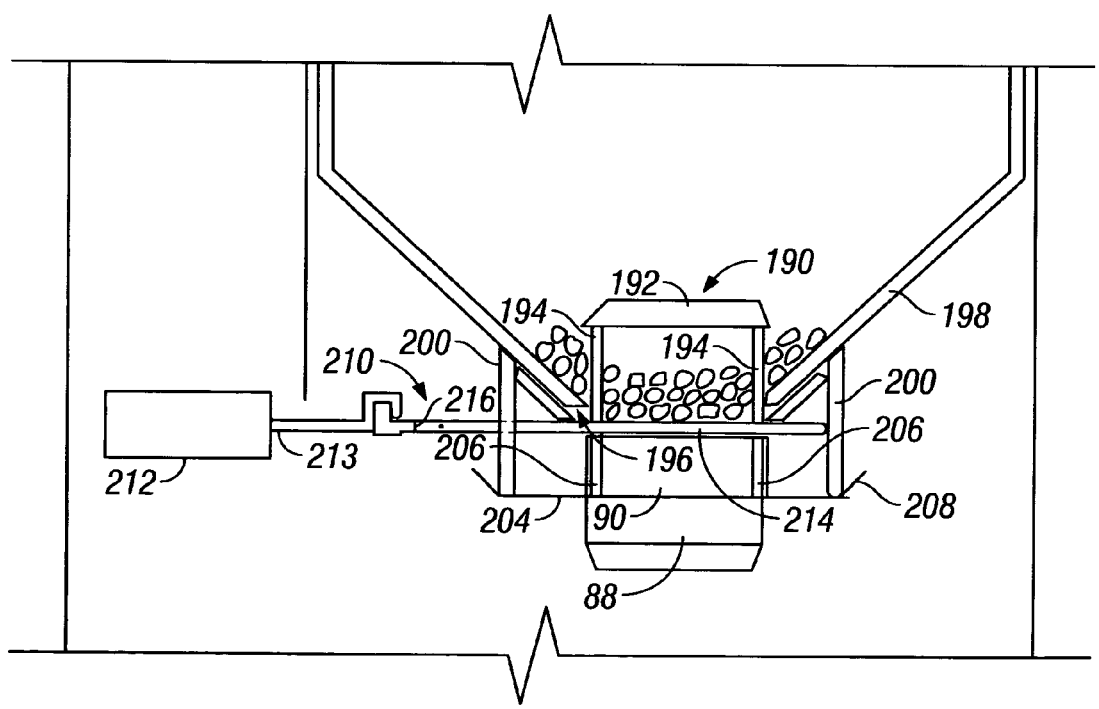
FIG. 12 is a side view schematic illustration of another embodiment of the grinder assembly of the present invention that employs the tool-less removable hopper assembly of FIG. 11 in combination with an entirely separate electromechanical gate that operates independently of the closure member that is kept in an open position.
Figure 13:
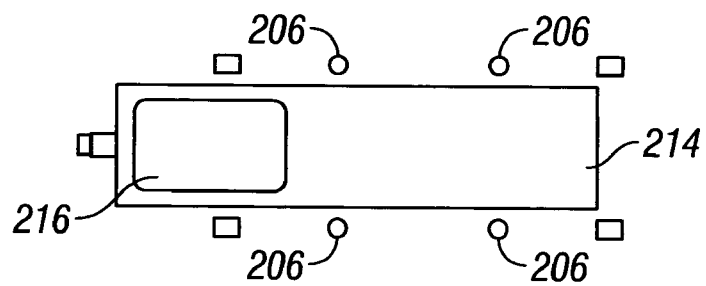
FIG. 13 is a schematic plan view of the electromechanically operated gate of FIG. 12.

Referring now to FIGS. 11-13, another embodiment of the invention is shown in which the lateral sliding closure member 116 of the previous embodiments has been replaced by another closure assembly 190 with a closure member 192 and a four (only two shown), substantially identical, equally spaced, guide legs 194 that extend through the outlet opening 196 of the hopper 198. The guide legs 194 extend downwardly from an underside of the closure member 192 and maintain the closure member 192 in proper alignment with the outlet opening 196 during movement between the closed position shown in FIG. 11 and the open position shown in FIG. 12. As seen in FIG. 11, when no upward force is applied to the guide legs 194, the force of gravity acting on the closure member 192 and the attached guide legs 194, and on any food ingredient within the hopper and pressing down on the top surface of the closure member (none shown in FIG. 1), automatically moves the closure member 192 downwardly to the closed position. The hopper has at least one support member 200 for supporting the hopper body 198 in an upright position as shown and is dimensioned to support the bottoms of the guide legs 194 spaced above a support surface 202, such as a counter top, so that the force of the support surface 202 does not press against the guide legs 194 and press the closure member 192 upwardly and away from the closed position. If desired, the force of gravity may be supplemented by spring or the like (not shown) to bias the closure member toward the closed position.

Referring to FIG. 12, when the hopper is lowered toward the operative position within the housing, the guide legs are engaged by aligned, underlying, fixedly mounted, pusher members 206 which push upwardly on the bottoms of the guide legs 194 move the closure member 192 relatively upwardly away from the closed position. The upward movement stops when the bottom of the support members 200 engage a support surface 204 on to which they are guided by beveled walls 208. Engagement of the support members 200 by the support surface 204 occurs before the guide legs 194 are pushed out of guiding relationship with the outlet opening 196. The closure member 192 then remains in the open position and passage of the food ingredient from the outlet opening 196 of the hopper to the inlet 90 of the intake manifold 88 for passage to the grinding chamber is controlled by separate closure gate assembly 210 that does not interact with or move the closure member 190. Instead, it operates independently of the closure member 192 that remains open. When it is desired to pass ingredient to the grinding chamber, then a solenoid or other suitable electromechanical device 212 (electric motor, magnet, etc. with linkage 213, as needed) is energized. When energized, the device 212 and any linkage slidably moves the closure gate 214 from the closed position shown in FIG. 12 to an open position. In the open position, a passageway 216 through the closure gate 213 is aligned with the open outlet opening 196 to enable the passage of ingredient through the passageway 216 to the grinding chamber.

Advantageously, with this embodiment, it is permissible to have a hard connection between the closure gate and the linkage 213 because the closure gate 214 is separate and apart from, and not attached to, the hopper body. It operates independently of the closure member 192 and does nothing to move the closure member to either an open or a closed position. Also, advantageously, the closure assembly 192 may be separated from the hopper body 198 for cleaning or replacement without the use of tools.

Figure 14:
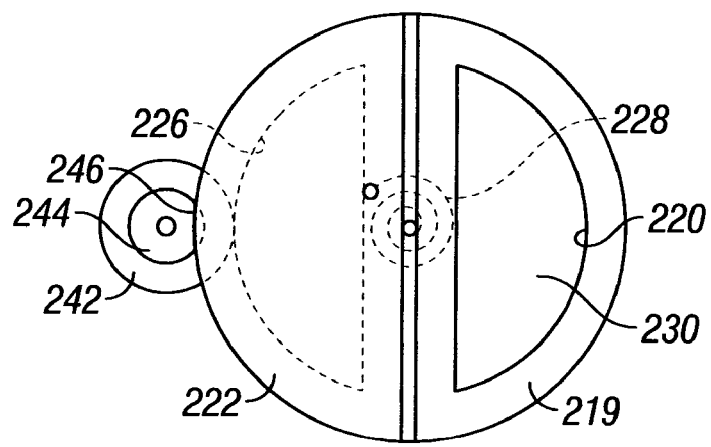
FIG. 14 is a schematic plan view of another embodiment of a closure member that is mounted for rotary movement between the closed and open positions.
Figure 15:
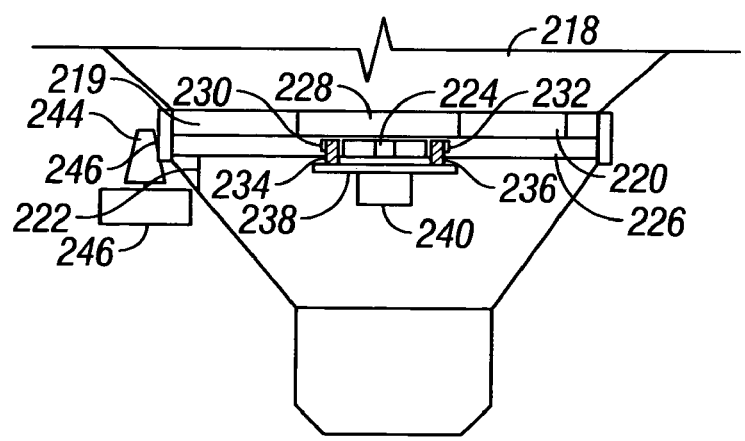
FIG. 15 is a schematic side view illustration of a hopper with the closure member of FIG. 14 and which is used with a rotary electromechanically driven closure member.

Referring now to FIGS. 14 and 15, rotary movement instead of linear sliding movement is used to control the passage of ingredient. A hopper 218 is provided with a fixedly mounted round bottom 219 with an asymmetrical outlet opening 220 located on only one side of the round bottom. A round closure plate 222 is mounted for rotation around a central axle 224 extending downwardly from the round bottom 219 and has an asymmetrical valve opening 226 located on only one side of the central axle 224. A coil spring 228 having one end secured to the central axle and an opposed end attached to a spring mounting post 230 space from the central axle spring biases the rotatably mounted closure plate to move to the closed position shown in FIG. 14. In the closed position, the valve opening 226 is not aligned with, but is located opposite of, the hopper outlet opening 220. In the closed position the outlet opening is blocked closed by an underlying blocking portion 228 of the closure plate 222 and no ingredient may flow out of the hopper 218.

The bottom closure plate has a pair of female connector members 230 and 232 formed as contoured or beveled holes in the underside of the bottom closure plate 222 within which are received mating beveled or contoured male connector members 234 and 236 are mounted at opposite sides of a rotary drive member 238. The rotary drive member 238 is attached to a rotary electromechanical drive mechanism 240, such as a rotary solenoid, stepper motor, servomotor, D.C motor or the like. When the hopper 218 is lowered into the operative position, as shown in FIG. 15, the male connectors 234 and 236 are automatically received within the mating female connectors 230 and 232. Then, when it is desired to move the closure plate 222 to the open position, as shown in FIG. 15, with the outlet opening 220 and valve opening 226 aligned with each other, the rotary drive mechanism 240 is energized to rotate the rotary drive member 238 180-degrees from the closed position to the open position in opposition to the spring bias provided by coil spring 228. When it is desired to return to the closed position either the rotary drive mechanism 240 is merely de-energized to allow the spring return the closure plate 222 to the closed position, or the rotary drive mechanism is operated in reverse to return the closure plate to the closed position. When it is desired to remove the hopper 220 from the operative position and from the housing, the hopper only needs to be lifted vertically without the need of any tools to disconnect the closure plate from the derive mechanism 240.

Referring still to FIGS. 14, and 15, the drive mechanism 240 my be replaced with a like rotary drive mechanism 242 that drives a conical wheel 244 upon which the rim 246 of the closure plate is lowered onto during installation of the hopper 218 into the operative position. Again, the engagement of the rim 246 with the conical drive wheel 244 during installation and the disengagement during removal of the hopper 218 is inherent in the simple lowering and lifting of the hopper into and out of the operative position and neither requires the use of any tools.

Advantageously, when using a motor, such as the rotary drive mechanism 240 or 242, as opposed to a solenoid that basically has only two states and two associated positions, the closure gate may be selectively controlled to move to intermediate positions between the fully closed position and the fully open position to enable metering the flow-rate of the ingredient, perhaps slowing down the flow rate as the end of the cycle is being reached, for improved quantity accuracy of delivery. While a solenoid is shown as the drive mechanisms in the embodiments of FIGS. 1-13, it should be appreciated they could be substituted with rotary servomotors or other rotary drive devices combined with a suitable linkage to impart the desired reciprocal movement.

Figure 16:
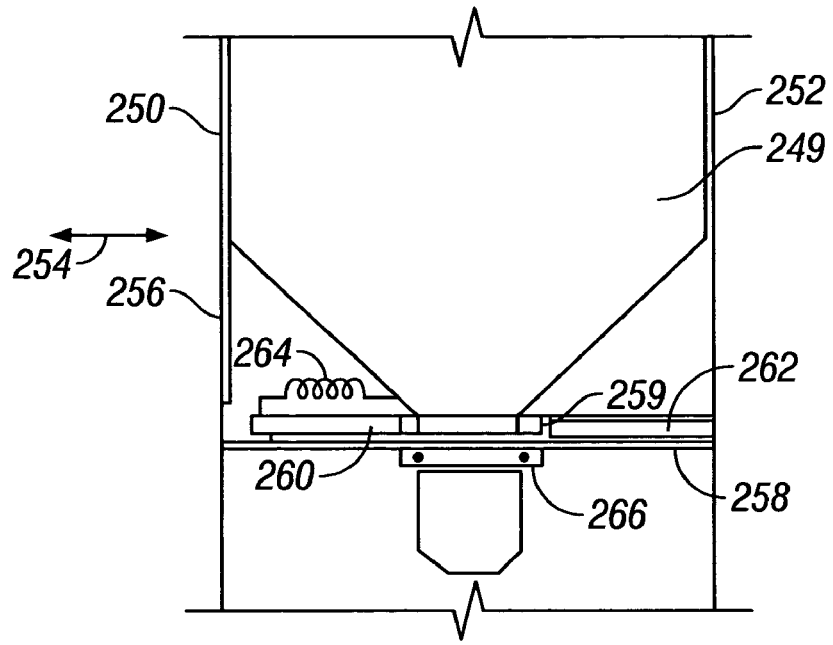
FIG. 16 is a schematic side view illustration of another embodiment of the grinder with removable hopper assembly of the present invention in which the hopper is installed into the operative position and removed by laterally sliding the hopper through a side of the housing assembly and in which the hopper closure is automatically opened when installed into the operative position and is used in conjunction with a separate electromechanically driven closure gate that does not interact with the closure member, in a manner similar to the embodiment of FIGS. 1-13.
Figure 17:
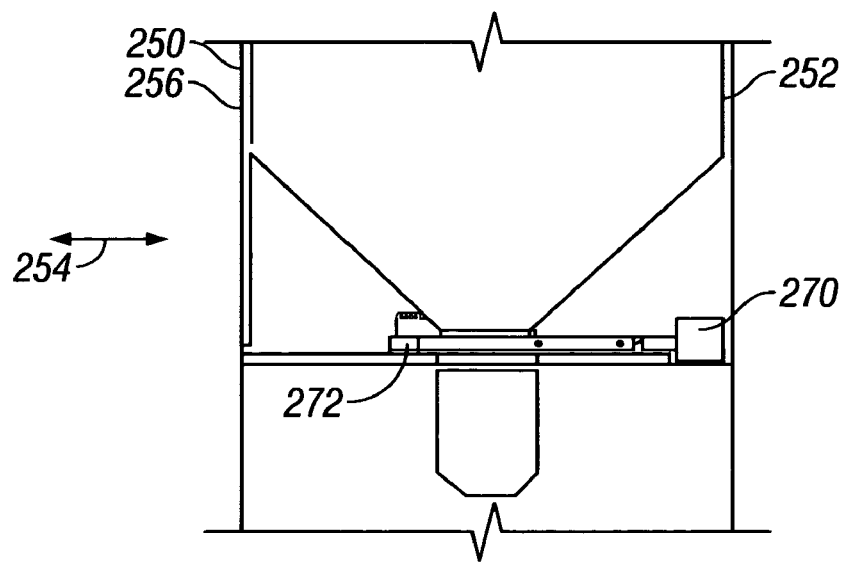
FIG. 17 is another schematic side view illustration of another embodiment of the grinder another embodiment of the grinder with removable hopper assembly of the present invention in which the hopper is installed into the operative position and removed by laterally sliding the hopper through a side of the housing assembly, in a manner similar to that of FIG. 16, but in which the closure assembly remains closed when installed into the operative position and is selectively engaged by opened by an electromechanical device.

Referring now to FIGS. 16 and 17, the present invention contemplates a tool-less removable hopper assembly for a grinder in which the hopper 249 is installed and removed by moving it laterally through a side 250 of the housing 252 in the direction of double-headed arrow 254. The sidewall may be the back of the unit, the front either one of the sides of the housing. A closure door may be provide, or the hopper may carry a closure panel 256 that closes the opening in the housing 252 when the hopper 249 is laterally slid or otherwise laterally moved into the operative position. The housing has one or more support members 258 on which the bottom of the hopper 249 may rest and be slid, or the hopper is suspended from and slides on mounting flanges 106 that are slid along the top edge of the housing walls.

In the side-mounting embodiment of FIG. 16, the closure gate 258 is automatically opened when the hopper 249 is laterally slid into the operative position as shown in FIG. 16. The leading edge 259 of a slidable closure gate 260, similar to that shown in FIGS. 6A and 6B, is engaged by a fixed pusher member 262 contained within the housing 249 and located above the support member 258 and aligned with the leading edge 259. As the hopper body 249 continues to be moved laterally after being engaged by the fixed pusher member 262 the closure gate 260 is slid relative to the housing 249 until it has been pushed to the closed position, as shown in FIG. 16. This sliding movement is opposed by a bias spring 264, and when the hopper is laterally slid away from the fixed pusher member 262, the spring 264 automatically moves the closure gate 260 to the closed position, such as shown in FIG. 6A.

The closure member 260 is maintained in the open position so long as the hopper remains in the operative position. Control of the passage of ingredient from the open hopper 249 is controlled by a separate and independent gate assembly 266 that is entirely maintained permanently within the housing and which does not interact with closure gate assembly carried by the hopper 249, in the same manner describe above with reference to FIGS. 11-13, except that it s movement is perpendicular to the movement of the closure gate 260.

In the side mounted hopper assembly of FIG. 17, the closure drive mechanism 270 operates on the closure gate 272 to push it to the open position and the closure gate remains closed when laterally installed into the operative position shown in FIG. 17. The closure gate is substantially the same as that of FIGS. 6A and 6B, either with a solenoid or a motor and linkage substitute, or other equivalent as described above.

While a particular embodiment has been disclosed in detail to illustrate the invention it should be appreciated that many variations may be made without departing from the spirit of the invention, the scope of which is defined in the following claims. For instance, it should be appreciated that there may be types of releasable, tool-less interconnections between the drive mechanisms and the closure gates described above with reference to FIGS. 6A, 6B, 7A, 7b, 8A, 8B, 12 and 15, that permit tool-less connection and disconnection and are functionally equivalent to those shown and will occur to persons of ordinary skill in the art. Also, each form of connection that is used with one of the embodiments may be used with any other embodiment unless otherwise indicated. Similarly, with respect to the embodiments in which the closure gate carried by the hopper is not operated on by the drive mechanism but is kept open, it will be appreciated that other forms are possible that are functionally equivalent, and that the various drive mechanisms used in one form of the invention can be used with the other forms.

The invention claimed is:

1. In a grinder assembly for grinding a food ingredient and having a frame, a protective housing mounted to the frame with a top, a grinding chamber containing at least one powered grinding member mounted to the frame within the housing, the improvement being a removable hopper assembly, comprising:
   a removable ingredient hopper body for holding ingredient to be ground, said ingredient hopper body having an open top for receipt of ingredient to be ground, a bottom with a hopper outlet opening and means for releasably mounting the hopper body within the housing at an operative position in which ingredient may be passed from the hopper body to the grinding chamber;
   a hopper closure assembly attached to the hopper and including
      a closure member mounted for movement between an open position and a closed position, and means attached to the hopper body for automatically moving the closure member to the closed position in which the hopper outlet opening is closed by the closure member; and an electromechanical device permanently mounted within the housing for selectively moving the closure member to the open position when the hopper is releasably mounted at the operative position, engagement of the device with the closure member being non-interfering with manual, tool-less removal of the hopper body by simple manual lifting of the hopper upwardly away from the operative position and out of the top of the housing.

2. The grinding assembly claim 1 in which the closure member is mounted for laterally sliding movement between the open position and the closed position and the electromechanical device has a pusher member that selectively pushes the closure member laterally to the open position and the pusher member is laterally spaced from and out of engagement when in a closed position.

3. The grinding assembly of claim 2 in which the electromechanical device is a linear solenoid with a body member and the pusher member is moved away from the solenoid body when the solenoid is energized to engage and push the closure member to the open position.

4. The grinding assembly of claim 2 in which the automatic closure member moving means is a spring.

5. The grinding assembly of claim 1 in which the closure member is mounted for laterally sliding movement between the open position and the closed position and the electromechanical device has a puller member that selectively pulls the closure member laterally to the open position.

6. The grinding assembly of claim 5 in which a releasable connector is mounted to the puller member connector and the closure member is permanently connected to another mating connector for mating releasable engagement with the releasable connector.

7. The grinding assembly of claim 6 in which the one of the releasable connector and the other mating connector is a male member and the other of the one connector and the other connector is a mating female member.

8. The grinding assembly of claim 7 which the female member has an opening that faces in a vertical direction and the male member is received within the opening when the hopper body is lowered through the top into the operative position and is slidably separated from within the opening when the hopper body is lifted vertically out of the housing top and separated from the housing.

9. The grinding assembly of claim 8 in which the male member has an inwardly tapered distal end to guide and facilitate insertion of the male member into the opening.

10. The grinding assembly of claim 8 in which the male member is mounted to the distal end of the pusher member and extends upwardly and the female member is attached to the closure member with the opening of the female member facing downwardly.

11. The grinding assembly of claim 8 in which the male member is mounted to the closure member and extends downwardly and the female member is attached to the distal end of the pusher member will the opening racing upwardly.

12. The grinding assembly of claim 7 in which the male member has an inwardly tapered distal end to guide and facilitate insertion of the male member into the opening.

13. The grinding assembly of claim 5 in which one of the releasable connector and the other mating connector includes a permanent magnet.

14. The grinding assembly of claim 13 in which the other of the releasable connector and the other mating connector includes one of (a) another permanent magnet, and (b) a ferromagnetic member.

15. The grinding assembly of claim 14 in which the permanent magnet and the one of the other permanent magnet and the ferromagnetic member magnetically adhere to each other when the hopper body is lowered to the operative position.

16. The grinding assembly of claim 5 in which one of the releasable connector and the other mating connector includes a fastener hook array member and the other of the releasable connector and the other mating connector includes a fastener loop array member for mating releasable connection with the fastener hook array member when the hopper body is lowered to the operative position.

17. The grinder assembly of claim 1 in which the means for releasable mounting the hopper includes at least one hopper mounting member extending laterally outwardly from at least one of the opposite sides of the hopper, and at least one hopper mounting support member attached to the frame and providing underlying hanging support for the at least one hopper mounting member.

18. A food ingredient hopper assembly adapted for use with a food grinder assembly having a protective housing, comprising:

a manually portable, removable, hopper body for containing a supply of ingredient to be ground by a mating grinding assembly having a housing within which the body is adapted for releasable mounted engagement in an operative location protectively contained within a housing;

means carried by the removable hopper body for releasable mounted relationship with the hopper body at an operative location within the housing at which ingredient may be selectively passed to a grinding chamber of the grinder assembly:

a hopper outlet opening at the bottom of the hopper; and a hopper outlet closure assembly mounted to the hopper body adjacent to the hopper outlet opening and having a closure member with attached means for engagement by electromechanical means to enable movement of the closure member to an open position by automatic opening apparatus protectively contained within the housing when the hopper body is located in the operative position.

19. The food ingredient hopper assembly of claim 18 including a mounting member attached adjacent to the top of the hopper body and extending outwardly from the side of the body for underlying supportive hanging engagement with a mating, hopper mounting member of the food grinder assembly with which it is adapted for use.

20. The grinding assembly of claim 18 in which the engagement means includes a generally vertical engagement wall connected to the closure member that is positioned for engagement by a pusher member of the electromechanical to push the closure member to the open position, said pusher member being laterally spaced from, and out of engagement with the engagement member when the closure member is in a closed position.

21. The grinding assembly of claim 20 in which the electromechanical device is a linear solenoid with a body member and the pusher member is moved away from the solenoid body when the solenoid is energized to engage and push the engagement wall to slide the closure member to the open position.

22. The grinding assembly of claim 18 including an automatic closure means that automatically moves the closure member to a closed position when not being moved to an open position by the electromechanical means.

23. The grinding assembly of claim 22 in which the automatic closure means includes at least one of (a) a spring and (b) a permanent magnet.

24. The grinding assembly of claim 18 in which the closure member is mounted for laterally sliding movement between the open position and the closed position and the electromechanical means has a puller member that selectively pulls the closure member laterally to the open position.

25. The grinding assembly of claim 24 in which a releasable connector is mounted to the puller member connector and the closure member is permanently connected to another mating connector for mating releasable engagement with the releasable connector.

26. The grinding assembly of claim 25 in which the one of the releasable connector and the other mating connector is a male member and the other of the one connector and the other connector is a mating female member.

27. The grinding assembly of claim 26 which the female member has an opening that faces in a vertical direction and the male member is received within the opening when the hopper body is lowered through the top into the operative position and is slideably separated from within the opening when the hopper body is lifted vertically out of the housing top and separated from the housing.

28. The grinding assembly of claim 27 in which the male member has an inwardly tapered distal end to guide and facilitate insertion of the male member into the opening.

29. The grinding assembly of claim 26 in which the male member has an inwardly tapered distal end to guide and facilitate insertion of the male member into the opening.

30. The grinding assembly of claim 27 in which the male member is mounted to the distal end of the pusher member and extends upwardly and the female member is attached to the closure member with the opening of the female member facing downwardly.

31. The grinding assembly of claim 27 in which the male member is mounted to the closure member and extends downwardly and the female member is attached to the distal end of the pusher member with the opening facing upwardly.

32. The grinding assembly of claim 24 in which one of the releasable connector and the other mating connector includes a permanent magnet.

33. The grinding assembly of claim 32 in which the other of the releasable connector and the other mating connector includes one of (a) another permanent magnet, and (b) a ferromagnetic member.

34. The grinding assembly of claim 33 in which the permanent magnet and the one of the other permanent magnet and We ferromagnetic member magnetically adhere to each other when the hopper body is lowered to the operative position.

35. The grinding assembly of claim 24 in which one of the releasable connector and the other mating connector includes a fastener hook array member and the other of the releasable connector and the other mating connector includes a fastener loop array member for mating releasable connection with the fastener hook array member when the hopper body is lowered to the operative position.

36. The grinder assembly of claim 18 in which the means for releasable mounting the hopper includes
at least one hopper mounting member extending laterally outwardly from at least one of the opposite sides of the hopper, and
at least one hopper mounting support member attached to the frame and providing underlying hanging support for the at least one hopper mounting member.

37. For use in an electric food ingredient grinder having a housing within which are located an ingredient hopper body with a hopper outlet opening for passing ingredient to a grinding chamber, a method for tool-less mounting and removal of the ingredient hopper comprising the steps of:
removably mounting the ingredient hopper within the housing at an operative position in which a closure member carried by the ingredient hopper body is movable to an open position by an electromechanical means contained within the housing;
automatically moving the closure member to a closed position by means carried by the ingredient hopper when unopposed by the electromechanical means;
selectively energizing the electromechanical means for selectively moving the closure member to the closed position in opposition to the automatically moving means to pass ingredient from the hopper to the grinding chamber;
removing the ingredient hopper body from within the housing by simply manually lifting the hopper body upwardly out of the top of the housing.

38. The method of claim 37 including the step of de-energizing the electromechanical means prior to removing the ingredient hopper body from the within the housing to enable automatic movement of the closure member to the closed position prior to removal.

39. The method of claim 37 in which the step of selectively moving the closure member to the closed position is performed by pushing the closure member to the closed position with a pusher member when the electromechanical means is energized.

40. The method of claim 39 including the step of moving the pusher member to a lateral position in which the electromechanical means is de-energized that is spaced from a vertical path taken by the hopper body when being installed or removed through the top of the housing to prevent any interference by the pusher member with such installing and removal of the hopper body.

41. The method of claim 37 in which the step of selectively moving the closure member to the closed position is performed by pulling the closure member through a releasable connection with the electromagnetic means to the to the closed position a when the electromechanical means is energized.

42. The method of claim 37 in which the electromechanical means has a connector and the closure member has another connector and including the step of mating the one connector with the other connector automatically during vertical installation into the open top of the housing and into the operative position.

43. The method of claim 42 including the step of separating the one connector and the other connector during vertical removal from of the hopper body from the open top of the housing.

44. The method of claim 37 in which the step of mating the connectors includes the step of receiving in a vertical direction, a male connector in a vertical direction and carded by one of the hopper and the electromechanical means within an opening of a mating female connector carded by the other of the hopper body and the electromechanical means automatically during installation of the hopper body by lowering the hopper through the housing rap into the operating position.

45. The method of claim 44 in which the step of separating the connectors includes the step of separating in a vertical direction, a male connector in a vertical direction and carried by one of the hopper and the electromechanical means from within an opening of a mating female connector carried by the other of the hopper body and the electromechanical means automatically during removal of the hopper body by lifting the hopper through the housing top and out of the operating position.

46. The method of claim 37 in which at least one of the connectors is a permanent magnet and another one of the connectors is either a permanent magnet or a ferromagnetic material, and including the steps of
  interconnecting the two connectors automatically during installation of the hopper into the operative position to hold by magnetic attractive force against lateral separation during pulling of the closure member to the closed position, and
  separating the two connectors automatically during removal of the hopper from the operative position by pulling them apart in a vertical direction in opposition to the magnetic attractive force.

47. The method of claim 37 in which the at least one of the connectors is an array of resilient hook-like members and the other one of the connectors includes and array of hook-like members and including the steps of
  interconnecting the two connectors automatically during installation of the hopper into the operative position to hold them against lateral separation during pulling of the closure member to the closed position, and
  separating the two connectors automatically during removal of the hopper from the operative position by pulling them apart in a vertical direction.

48. In a grinder assembly for grinding a food ingredient and having a frame, a protective housing mounted to the frame with a top, a grinding chamber containing at least one powered grinding member mounted to the frame within the housing, the improvement being a removable hopper assembly, comprising:
  a removable ingredient hopper body for holding ingredient to be ground, said ingredient hopper body having an open top for receipt of ingredient to be ground, a bottom with a hopper outlet opening and means for releasably mounting the hopper body within the housing at an operative position in which ingredient may be passed from the hopper body to the grinding chamber;
  a hopper closure assembly attached to the hopper and including
    a closure member mounted for movement between an open position and a closed position, and
    means attached to the hopper body for automatically moving the closure member to the closed position in which the hopper outlet opening is closed by the closure member; and
  an electromagnet permanently mounted within the housing for selectively moving the closure member to the open position when the hopper is releasably mounted at the operative position, energizing of the electromagnet creating an electromagnetic force that moves the closure member to the closed position, said electromagnet being spaced from engagement of the device with the closure member being non-interfering with manual, tool-less removal of the hopper body by simple manual lifting of the hopper upwardly away from the operative position and out of the top of the housing.

49. The grinder assembly of claim 48 in which the electromagnetic force attracts the closure member to the open position.

50. The grinder assembly of claim 49 including a ferromagnetic member attached to the closure member and attracted by the magnetic force when the electromagnet is energized.

51. The grinder assembly of claim 50 in which the electromagnetic force repels the closure member to move to the open position.

52. The grinder assembly of claim 51 including a permanent magnet attached to the closure member and is repelled by the electromagnetic force from the electromagnet when energized to move the closure member to the closed position.

53. The grinder assembly of claim 48 in which the automatically closure member includes one of (a) a spring, and (b) a permanent magnet.

54. For use in an electric food ingredient grinder having a housing within which are located an ingredient hopper body with a hopper outlet opening for passing ingredient to a grinding chamber, a method for tool-less mounting and removal of the ingredient hopper comprising the steps of:
  removably mounting the ingredient hopper within the housing at an operative position in which a closure member carried by the ingredient hopper body is movable to an open position by magnetic force from an electromagnet protectively contained within the housing;
  automatically moving the closure member to a closed position by means carried by the ingredient hopper when unopposed by the electromechanical means;
  selectively energizing the electromagnet for selectively moving the closure member to the closed position with magnetic force in opposition to the automatically moving means to pass ingredient from the hopper to the grinding chamber;
  removing the ingredient hopper body from within the housing by simply manually lifting the hopper body upwardly out of the top of the housing.

55. The method of claim 54 in which the step of selectively moving the closure member to the closed position is performed by at least one of (a) pulling magnetic force and (b) a repulsive magnetic force.

56. In a grinder assembly for grinding a food ingredient and having a frame, a protective housing mounted to the frame with a top, a grinding chamber containing at least one powered grinding member mounted to the frame within the housing, the improvement being a removable hopper assembly, comprising:
  a removable ingredient hopper body for holding ingredient to be ground, said ingredient hopper body having an open top for receipt of ingredient to be ground, a bottom with a hopper outlet opening and means for releasably mounting the hopper body within the housing at an operative position in which ingredient may be passed from the hopper body to the grinding chamber;
  a hopper closure assembly attached to the hopper and including
    a closure member mounted for rotary movement between an open position and a closed position, and
    means attached to the hopper body for automatically rotating the closure member to the closed position in which the hopper outlet opening is closed by the closure member; and an electromechanical device permanently mounted within the housing for selectively rotating the closure member to the open position when the hopper is releasably mounted at the operative position, engagement of the device with the closure member being non-interfering with manual, tool-less removal of the hopper body by simple manual lifting of the hopper upwardly away from the operative position and out of the top of the housing.

57. The grinder assembly of claim 56 in which the electromechanical device is one of (a) a stepper motor, (2) a servo-motor, (3) a DC motor and (4) a rotary solenoid.

58. The grinder assembly of claim 57 in which the automatically rotating means includes a coil spring having one end attached to the hopper body and another end attached to the closure member.

59. The grinder assembly of claim 56 in which the automatically rotating means includes a coil spring having one end attached to the hopper body and another end attached to the closure member.

60. The grinder assembly of claim 56 in which the closure member includes a male connection members that is received within a mating female engagement member associated with the electromechanical device automatically when the hopper is lowered into the operating position.

61. The grinder assembly of claim 60 in which the male member is one of (a) pushed to the open position by the female member, and (b) pulled to the open position by the female member.

62. In a grinder assembly for grinding a food ingredient and having a frame, a protective housing mounted to the frame with a top, a grinding chamber containing at least one powered grinding member mounted to the frame within the housing, the improvement being a removable hopper assembly, comprising:
  a removable ingredient hopper body for holding ingredient to be ground, said ingredient hopper body having an open top for receipt of ingredient to be ground, a bottom with a hopper outlet opening and means for releasably mounting the hopper body within the housing at an operative position in which ingredient may be passed from the hopper body to the grinding chamber, said releasable mounting means providing a non-blocking support for the hopper body in the operative position of the hopper body from the to enable tool-less removal of the hopper body operative position solely by manual separation;
  a hopper closure assembly attached to the bottom of the hopper body and including
    a closure member mounted at the bottom for movement between an open position and a closed position,
    means for automatically moving the closure member to the closed position in which the hopper outlet opening is closed by the closure member when the hopper body is removed from the operative position, and
    means carried by the closure member for releasable engagement with a mating member within the housing for automatically moving the closure member to the open position when the hopper body is moved to the operative position; and
  an electromechanically operated gate interposed between the bottom of the hopper body and the grinding chamber and operating independently of the closure member for selectively passing food ingredient from the automatically opened hopper outlet opening to the grinding chamber.

63. The grinder assembly of claim 62 in which the closure member is contained within the body of the hopper and has guide legs extending from the closure member within the body through the outlet opening for guided sliding movement.

64. The grinder assembly of claim 62 in which engagement of the guide legs by the mating engagement member pushes the guide legs inwardly into the body of the hopper to move the closure member away from the outlet opening to an open position in which ingredient may pass around the closure member to the outlet.

65. The grinder assembly of claim 64 in which the automatically closing means includes the weight of the closure member and the guide legs that causes the closure member to move toward the outlet to the closed position in which the outlet is blocked by the closure member.

66. The grinder assembly of claim 62 in which the automatically closing means includes the weight of the closure member that causes the closure member to move downwardly toward the outlet to the closed position in which the outlet is blocked by the closure member when not pushed upwardly.

67. The grinder assembly of claim 62 in which the movement of the hopper body into and out of the operative position is one of (a) vertical movement through the top, and (b) sliding horizontal movement though a side of the housing.

68. In a grinder assembly for grinding a food ingredient and having a frame, a protective housing mounted to the frame with a top and a side, a grinding chamber containing at least one powered grinding member mounted to the frame within the housing, the improvement being a removable hopper assembly, comprising:
  a removable ingredient hopper body for holding ingredient to be ground, said ingredient hopper body having an open top for receipt of ingredient to be ground, a bottom with a hopper outlet opening and means For releasably mounting the hopper body within the housing at an operative position in which ingredient may be passed from the hopper body to the grinding chamber, said releasable mounting means providing a non-blocking support for the hopper body in the operative position of the hopper body to enable tool-less lateral sliding removal of the hopper body from the operative position solely by lateral sliding movement through the side of the housing;
  a hopper closure assembly attached to the bottom of the hopper body and including
    a closure member mounted at the bottom for movement between an open position and a closed position,
    means for automatically moving the closure member to the closed position in which the hopper outlet opening is closed by the closure member when the hopper body is removed from the operative position, and
    means carried by the closure member for releasable engagement with a mating member within the housing that automatically engages the closure member as it is slid into the operative position to automatically move the closure member to the open position when the hopper body is moved to the operative position; and
  an electromechanically operated gate interposed between the bottom of the hopper body and the grinding chamber and operating independently of the closure member for selectively passing food ingredient from the automatically opened hopper outlet opening to the grinding chamber.

69. In a grinder assembly for grinding a food ingredient and having a frame, a protective housing mounted to the frame with a top and a side, a grinding chamber containing at least one powered grinding member mounted to the frame within the housing, the improvement being a removable hopper assembly, comprising:

- a laterally removable ingredient hopper body for holding ingredient to be ground, said ingredient hopper body having an open top for receipt of ingredient to be ground, a bottom with a hopper outlet opening and means for releasably mounting the hopper body within the housing at an operative position in which ingredient may be passed from the hopper body to the grinding chamber by sliding the hopper into the operative position though the side of the housing;
- a hopper closure assembly attached to the hopper and including
  - a closure member mounted for movement between and open position and a closed position, and
  - means attached to the hopper body for automatically moving the closure member to the closed position in which the hopper outlet opening is closed by the closure member; and
- an electromechanical device permanently mounted within the housing for selectively moving the closure member to the open position when the hopper is releasably mounted at the operative position, engagement of the device with the closure member being non-interfering with manual, tool-less removal of the hopper body by simple manual lateral sliding movement of the hopper away from the operative position and though the side of the housing.

* * * * *